United States Patent [19]

Shenier

[11] 3,760,276

[45] Sept. 18, 1973

[54] DIGITAL TRANSMISSION SYSTEM

[75] Inventor: Richard S. Shenier, Forest Hills, N.Y.

[73] Assignee: Savin Business Machines Corporation, Valhalla, N.Y.

[22] Filed: Mar. 29, 1972

[21] Appl. No.: 239,302

[52] U.S. Cl. .................................. 325/38 B, 325/50
[51] Int. Cl. .................................................. H04b 1/68
[58] Field of Search ................................ 178/DIG. 3; 179/15.55 R; 325/38 R, 38 A, 38 B, 39, 49, 50

[56] References Cited

UNITED STATES PATENTS

| | | | |
|---|---|---|---|
| 3,638,122 | 1/1972 | Gibson | 325/50 |
| 3,042,867 | 7/1962 | Thompson | 325/50 |
| 3,566,036 | 2/1971 | Roche et al. | 325/50 |

*Primary Examiner*—Thomas A. Robinson
*Attorney*—Henry L. Shenier et al.

[57] ABSTRACT

A digital transmission system wherein low-frequency signal components are suppressed in transmission but restored by a compensating circuit in response to the high-frequency signal components transmitted.

80 Claims, 9 Drawing Figures

Patented Sept. 18, 1973 3,760,276

2 Sheets-Sheet 2

DIGITAL TRANSMISSION SYSTEM

BACKGROUND OF THE INVENTION

In the prior art low-frequency signal components including the carrier are transmitted, entailing the unnecessary use of available bandwidth. Furthermore, even vestigial side band systems require an appreciable range of frequencies for double side band operation about the carrier frequency, which causes a further loss of available bandwidth.

SUMMARY OF THE INVENTION

In general my invention contemplates the provision of a digital transmission system wherein low-frequency signal components including the carrier are suppressed in transmission. The band of suppressed low-frequency signal components may range, for example, from less than 1 percent of transmission bandwidth to more than 100 percent of transmission bandwidth. The speed of transmission of digital information is increased in proportion to the band of suppressed low-frequency signal components. No carrier or vestigial side band is transmitted. What is transmitted is the high-frequency signal components of a single side band.

For digital transmission, the encoder output changes in discrete voltage steps at predetermined intervals of time. Thus the essential nature of the transmission is known in advance; and the only unknown quantity is the magnitude of the discrete step, which is an integral multiple of some minimum voltage step. The spectrum of a unit step function contains all frequencies from zero to infinity. However, only the high-frequency components of the step-function spectrum are transmitted. A compensating circuit responsive to the transmitted high-frequency portion of the step-function spectrum supplies a close approximation of the suppressed low-frequency portion of the step-function spectrum. The output of the compensating circuit is added to the received signal, thereby to reconstruct the original step-function encoder output over both the low-frequency portion and the high-frequency portion of its spectrum.

One object of my invention is to provide a digital transmission system which provides an increased speed of information for the same transmission bandwidth.

Another object of my invention is to provide a digital transmission system wherein low-frequency signal components including the carrier are suppressed and in which only ,high-frequency signal components are transmitted.

A further object of my invention is to provide a digital transmission system having a compensating circuit which responds to the high-frequency signal components transmitted and generates the suppressed low-frequency signal components.

Other and further objects of my invention will appear from the following description.

BRIEF DESCRIPTION OF THE DRAWINGS

In the accompanying drawings which form part of the instant specification and are to be read in conjunction therewith and in which like reference numerals are used to indicate like parts in the various views.

DESCRIPTION OF THE PREFERRED EMBODIMENTS

Figures 1, 1A, 5:
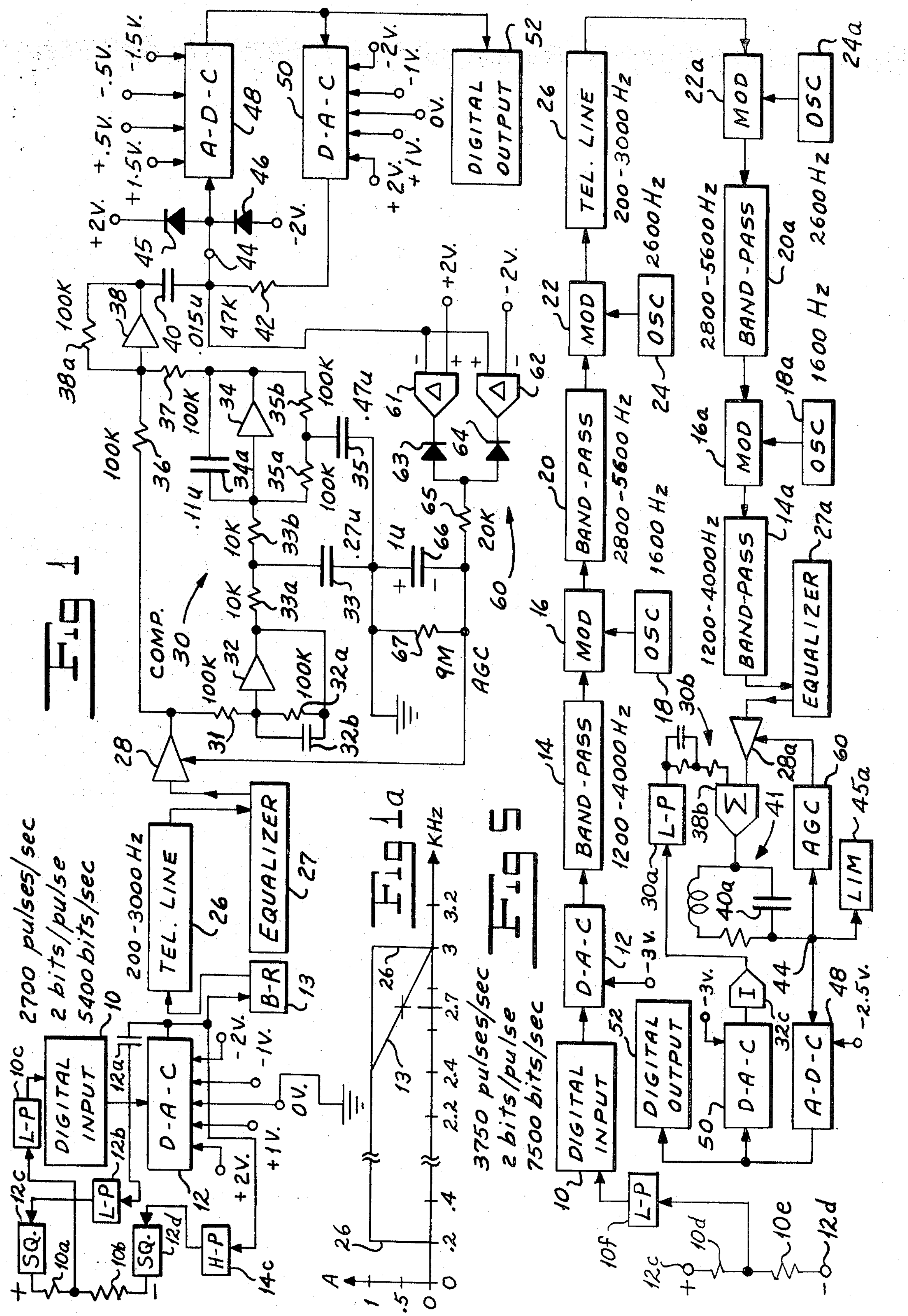
FIG. 1 is a schematic view illustrating a first embodiment of my invention.
FIG. 1*a* shows graphs of amplitude versus frequency for various portions of the circuit of FIG. 1.
FIG. 5 is a schematic view showing a second embodiment of my invention.

Referring now to FIG. 1 of the drawings, a digital input source 10 provides 2,700 pulses per second. Each pulse comprises two binary bits. Accordingly input source 10 provides information at a rate of 5,400 bits per second. Digital input source 10 is coupled to a digital-to-analog converter or encoder 12 which is provided with analog inputs of +2 volts, +1 volt, −1 volt, −2 volts, and 0 volts or ground potential. Encoder 12 is thus capable of providing five distinct voltage outputs.

Figures 2, 3, 4, 4A, 6, 7:
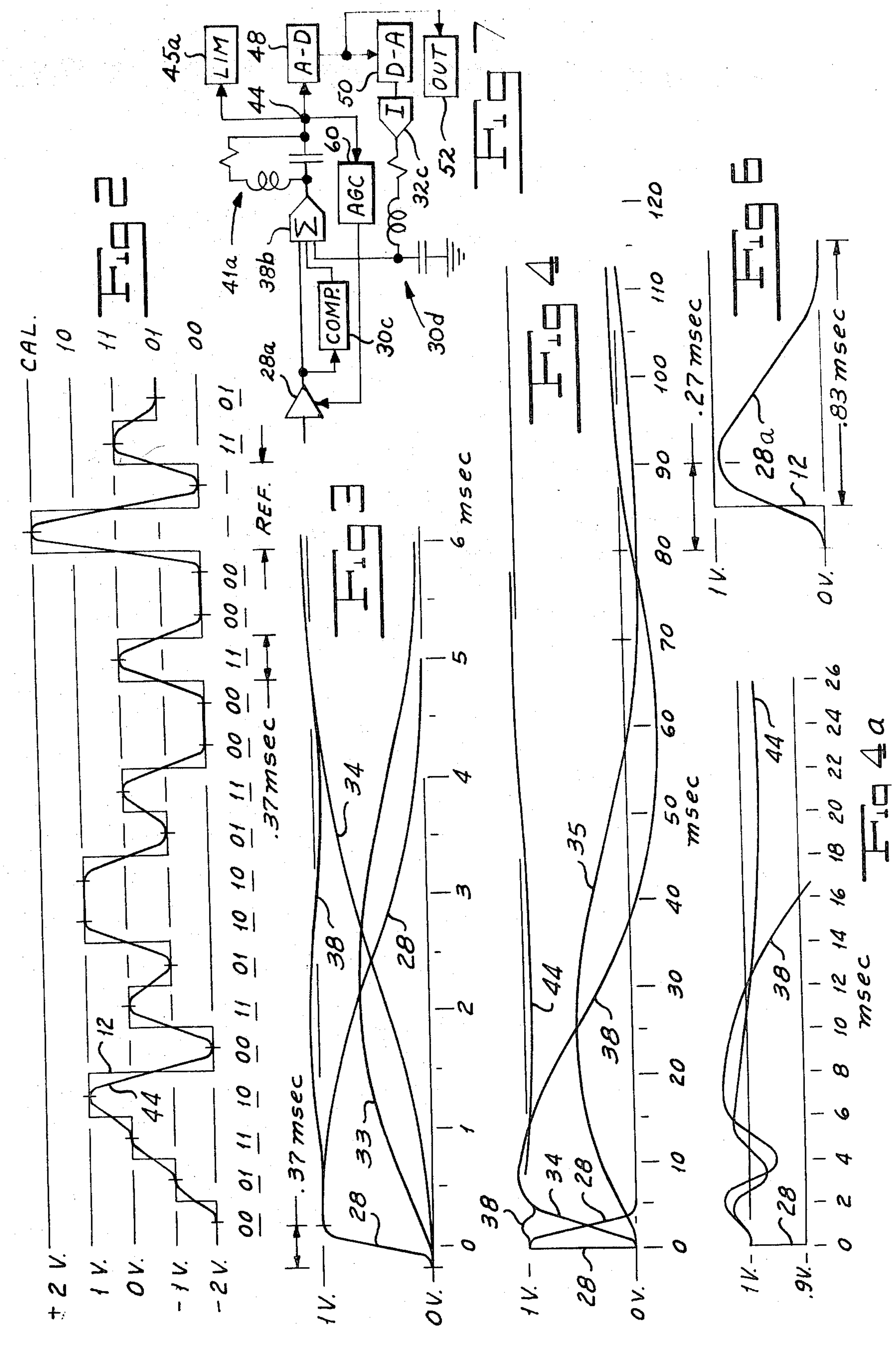
FIG. 2 is a graph showing a typical multiple-level encoder output signal and the corresponding signal reconstructed by use of a compensating circuit.
FIGS. 3, 4 and 4*a* are graphs showing voltage waveforms at various points for the embodiment of FIG. 1.
FIG. 6 is a graph showing the signal transmitted in response to a step function change in encoder output for the embodiment of FIG. 5.
FIG. 7 is a fragmentary schematic view showing a third embodiment alternative to that of FIG. 5.

Referring now to FIG. 2, curve 12 shows a typical output from encoder 12. It is assumed that an output of −2 volts corresponds to the binary bits 00, −1 volt corresponds to 01, 0 volts corresponds to 11, and that an output of +1 volt corresponds to the binary bits 10. Since the transmission rate is 2,700 pulses per second, the period for each pulse is 0.37 millisecond. The +2 volt level is not used for the transmission of binary bits, but is instead employed for purposes of calibration, synchronization, and the like. At periodic intervals of ten times per second, for example, the normal bit stream is interrupted; and source 10 causes encoder 12 to provide a first pulse of +2 volts followed by a second pulse of −2 volts. These two successive pulses comprise a "reference signal" which sweeps encoder 12 through its extreme range of outputs. It will be noted that the binary bits corresponding to the various voltage levels have been selected in accordance witha unit distance code so that an error of one voltage step will produce an error in only one bit of each pair of binary bits.

Referring again to FIG. 1 the output of encoder 12 is coupled through an upper band edge rejection filter 13 to a telephone line 26 having a pass band extending from 200 to 3,000 Hz. The output of the telephone line 26 is coupled through a phase equalizer 27 to the input of a variable gain amplifier 28. Equalizer 27 is preferably of the automatically self-adjusting type and compensates for phase distortion introduced by the telephone line 26 and filter 13.

Referring now to FIG. 1*a*, telephone line 26 exhibits a very sharp lower cutoff at 200 Hz = 0.2 KHz and a very sharp upper cutoff at 3 KHz. The band edge rejection filter 13 may be a notch filter having a frequency of maximum attenuation at 3 KHz. Band edge rejection filter 13 may have a 50 percent amplitude response at 2.7 KHz, for example. Thus band edge rejection filter 13 may cause the amplitude response to fall off linearly from a value of nearly unity at 2.4 KHz to substantially zero at 3 KHz. The more gradual cutoff provided by the notch filter 13 reduces the nominal upper cutoff frequency of the pass band to 2.7 KHz.

Sharp cutoff filters yield rapid changes in phase slope, and hence time delay, adjacent the cutoff frequency. These rapid changes in phase slope impose stringent requirements upon the equalizer if phase distortion is to be avoided. The more gradual cutoff provided by the upper band edge rejection filter 13 reduces the requirements imposed upon the equalizer to avoid phase distortion, because of the reduced relative amplitude of signal components approaching the sharp upper cutoff frequency of the telephone line.

The band edge notch filter may comprise an L section including a series input resistor and a shunt output impedance comprising a capacitor in series with a high Q inductor. The shunt output impedance should exhibit series resonance at 3 KHz. The series input resistance may be 400 ohms; and for the shunt output impedance, the reactances of the series-connected inductor and capacitor may each be 1,000 ohms at the upper band edge of 3 KHz. The Q of such filter is 2.5, which yields a close approximation to the linearly sloping upper cutoff characteristic 13 shown in FIG. 1*a*.

Alternatively, the band edge filter may comprise an L section including a shunt output resistor and a series input impedance comprising a capacitor shunted by a high Q inductor. The series input impedance should exhibit parallel resonance at the band edge. The shunt output resistance may be 2,500 ohms; and for the series input impedance, the reactances of the parallel-connected inductor and capacitor may each be 1,000 ohms at the upper band edge of 3 KHz. For this alternative filter the Q is again 2.5, so that the response will closely approximate the linearly sloping upper cutoff characteristic of FIG. 1*a*.

In actuality the band edge rejection filter does not yield the idealized linearly sloping characteristic of FIG. 1*a*. For a Q of 2.5 the actual response is 0.75 at 2,400 Hz, and is 0.47 at 2,700 Hz. Hence the Q should be increased to somewhat in excess of 2.5 in order to obtain the desired nominal cutoff frequency of 2,700 Hz.

If desired the band edge rejection filter may comprise a pair of L sections serially connected by a buffer amplifier to produce a somewhat more rapid S-shaped cutoff characteristic. Since it is still desired that the nominal upper cutoff frequency be 2,700 Hz, the Q's of each of the filter sections should be increased to approximately 5 either by reducing the series input resistance of a filter section having a series-resonant shunt output impedance or by increasing the shunt output resistance of a filter section having a parallel-resonant series input impedance.

Referring again to FIG. 1 the output of variable gain amplifier 28 is coupled through a 100 kilohm input resistor 31 to the input of an operational amplifier 32, the output of which is applied through a 100 K feedback resistor 32*a* to its input. The output of operational amplifier 32 is serially connected through respective 10 K resistors 33*a* and 33*b* to the input of an operational amplifier 34. The junction of resistors 33*a* and 33*b* is grounded through a 0.27 microfarad capacitor 33. The output of amplifier 34 is coupled through a 0.11 μ feedback capacitor 34*a* to its input. The output of amplifier 34 is further serially coupled through respective 100 K resistors 35*b* and 35*a* to its input. The junction of resistors 35*a* and 35*b* is grounded through a 0.47 μ capacitor 35. The outputs of amplifiers 28 and 34 are coupled through respective 100 K summing resistors 36 and 37 to the input of an operational amplifier 38, which is provided with a 100 K feedback resistor 38*a*. Components 31 through 35 form a compensating circuit indicated generally by the reference numeral 30.

The output of amplifier 38 is coupled through a 0.015 μ capacitor 40 to a terminal 44. Terminal 44 is connected to the "minus" input of a differential amplifier 61 and to the "plus " input of a differential amplifier 62. The "plus" input of differential amplifier 62 is maintained at a potential of +2 volts; and the "minus" input of differential amplifier 62 is maintained at a potential of −2 volts. The outputs of differential amplifiers 61 and 62 are connected to the cathodes of respective diodes 63 and 64. The anodes of diodes 63 and 64 are coupled through a 20 K resistor 65 to the negative terminal of a 1 μ capacitor 66, the positive terminal of which is grounded. Capacitor 66 is shunted by a 9 M resistor 67. Components 61 through 67 form an automatic gain control circuit indicated generally by the reference numeral 60. The output of AGC circuit 60 appears at the negative terminal of capacitor 66 and is coupled to the gain control input of variable gain amplifier 28.

Terminal 44 is connected to the anode of a limiter diode 45 and to the cathode of a limiter diode 46. The cathode of diode 45 is maintained at a potential of +2 volts; and the anode of diode 46 is maintained at a potential of −2 volts. Diodes 45 and 46 are preferably germanium rather than silicon. Terminal 44 is further coupled to the input of an analog-to-digital converter 48 which is provided with reference inputs of +1.5 volts, +0.5 volt, −0.5 volt, and −1.5 volts. As will be appreciated by those skilled in the art, if the input at terminal 44 is less than −1.5 volts, converter 48 provides an output representing the binary bits 00. If the input at terminal 44 is greater than −1.5 volts but less than −0.5 volt, then converter 48 provides an output representing the binary bits 01. If the input at terminal 44 is greater than −0.5 volt but less than +0.5 volt, then converter 48 provides an output representing the binary bits 11. If the input at terminal 44 is greater than +0.5 volt but less than +1.5 volts, then converter 48 provides an output representing the binary bits 10. If the input at terminal 44 exceeds +1.5 volts, then converter 48 provides a special output which may be used for calibration, synchronization, or like purposes. The outputs from converter 48 will thus correspond to the outputs from digital source 10. The output from converter 48 is coupled to a digital-to-analog converter 50, which may be of an identical construction to converter 12. The output of converter 50 is coupled through a 47 K resistor 42 to terminal 44. The output of converter 48 is also coupled to a digital output device 52.

The digital input device 10 may include a translator for accepting pairs of binary bits and producing a corresponding output on one of four lines. When the bit stream is momentarily interrupted to provide the calibrate pulse, digital input source 10 may provide a distinct output upon a fifth line. The five outputs of input source 10 will thus be connected to five corresponding inputs of converter 12. Similarly converter 48 may have five output lines which are coupled to corresponding inputs of converter 50 and digital output device 52. Output device 52 may include a translator which provides that pair of binary bits which correspond to the signal appearing upon one of its input lines.

In operation of the circuit of FIG. 1, and referring to FIG. 3, assume that at time zero the output of source 10 changes from 11 to 10 so that the output of converter 12 changes from 0 volts to +1 volt, thus providing a unit step function input through the band edge rejection filter 13 to telephone line 26. Since the nominal upper cutoff frequency of the pass band is reduced to 2,700 Hz by virtue of the upper band edge rejection filter 13, the output of amplifier 28 will change from 0 volts to +1 volt in a transient period of approximately 0.37 msec. This transient is shown as resembling an S-shaped curve having a rise time of approximately 0.18 msec.

Although the output of converter 12 remains at 1 volt, the output of amplifier 28 gradually decays, since telephone line 26 does not pass any frequencies less than 200 Hz. The output of amplifier 28 will decay from +1 volt to 0 volts in a transient period of approximately 5 msec. This transient is shown as resembling an S-shaped curve having a decay time of approximately 2.4 msec.

Equalizer 27 should compensate for phase distortion caused by the telephone line and filter 13 over the frequency band from 208 Hz to approximately 2,700 Hz. Residual phase distortion at frequencies above 2,700 Hz, however, produces little change in the waveform, because the amplitudes of these signal components are small. Residual phase distortion at frequencies below 208 Hz is desirable, since this phase distortion delays the decaying transient so that it occurs after the step function input.

The response of a perfectly equalized high-pass filter to a positive step function input is an antisymmetrical waveform comprising a negative increasing exponential preceding the step and a positive decreasing exponential following the step. The response of a simple R-C high-pass filter, having a series input capacitor and a shunt output resistor, to a positive step function input comprises only a positive decreasing exponential following the step. The simple R-C filter has only moderate phase distortion and produces only a moderate delay in the decaying transient. An appreciably greater phase distortion and time delay of the low-frequency signal components is desired so that the decaying transient occurs entirely after the step. This yields the S-shaped decaying transient shown in FIG. 3. A decaying transient of this nature is inherently produced by any high-pass filter having series capacitors and shunt inductors. Further increases in phase distortion, as by increasing the number of high-pass sections or increasing the sharpness of the lower cutoff of the band-pass filter, will not significantly change the waveform.

The output of amplifier 28 is inverted by operational amplifier 32 and applied to the low-pass filter comprising capacitor 33 and resistor 33*a* and 33*b*. In FIG. 3, curve 33 corresponds to the negative of twice the voltage across capacitor 33. The initial portion of curve 33 is shown as having the shape of the first quadrant of a sine wave which begins rising from a value of zero slightly before 0 msec to a maximum value somewhat exceeding 0.5 volt at 2.2 msec. The remaining portion of curve 33, however, does not precisely resemble the second quadrant of a sine wave, since it does not drop to zero at 5 msec but instead exhibits an exponential decay which extends out beyond 6 msec.

The output across the low-pass filter capacitor 33 is applied to integrator 34. In FIG. 3, the curve 34 represents the output of amplifier 34. It will be noted that curve 34 is of an S-shaped nature having a transient period somewhat in excess of 5 msec and a rise time of approximately 2.4 msec.

The outputs of amplifiers 28 and 34 are coupled to summing amplifier 38. In FIG. 3, curve 38 shows the output of amplifier 38. It will be noted that the compensation provided by circuit 30 is not perfect since curve 38 exhibits some ripple from a nominally constant value of +1 volt between 0 msec and 6 msec. Curve 38 has a peak at 2 msec, a dip at 4 msec, and a peak at 6 msec.

As shown in FIG. 4 the output of amplifier 34, and hence the output of amplifier 38, thereafter decay in an oscillatory manner, because of the current through the resistive feedback circuit comprising components 35, 35*a*, and 35*b*. In FIG. 4, curve 35 represents twice the voltage across capacitor 35. the decaying oscillation at the output of amplifier 34 and across capacitor 35 requires approximately 55 msec for one-half cycle and 110 msec for a full cycle, corresponding to a frequency of 9 Hz. After each half cycle of oscillation the amplitude is shown as being reduced by a factor of three; and after each full cycle the amplitude is shown as being reduced by a factor of nine. Capacitor 35 governs the amount of overshoot. A larger value of capacitor 35 reduces the damping and also reduces the oscillatory frequency. Increasing the values of resistors 35*a* and 35*b* reduces the oscillatory frequency but does not appreciably change the damping or amount of overshoot.

The indicated values for capacitors 33 and 34*a* are only approximations to the correct values. These capacitors should be trimmed to their proper values. Capacitors 34*a* should be adjusted so that the output of amplifier 38 is approximately +1.04 volts at 6 msec. If the voltage at 6 msec is excessive, the value of capacitor 34*a* should be increased; and if the voltage is insufficient, the value of capacitor 34*a* should be reduced. Capacitor 33 should now be adjusted so that the output of amplifier 38 exhibits a ripple peak at 2 msec which is equal to the ripple dip at 4 msec. If the peak at 2 msec is excessive and the dip at 4 msec is insufficient, then the value of capacitor 33 should be increased; and if the peak at 2 msec is insufficient and the dip at 4 msec is excessive, then the value of capacitor 33 should be reduced. Capacitor 34*a* may now be readjusted to make the ripple at 6 msec equal to the average of that at 2 msec and 4 msec. Capacitor 33 may now be readjusted for equal ripple at 2 msec and 4 msec.

Proper adjustment of capacitors 33 and 34*a* will produce an output from amplifier 38 which exhibits substantially equal ripple above and below +1 volt between 0 msec and 6 msec.

In FIG. 1 the compensating circuit 30 supplies a close approximation to the suppressed low-frequency signal components within the band from 200 Hz down to approximately 9 Hz. The remaining suppressed low-frequency signal components, including the carrier, in the frequency band from zero to 9 Hz are supplied by digital-to-analog converter 50.

In operation of the remaining portion of the circuit of FIG. 1, the reference signals provided by encoder 12, having a peak-to-peak amplitude of 4 volts, are coupled through telephone line 26 to amplifier 28. Amplifier 28 should have a maximum gain sufficiently in excess of unity to more than compensate for the maximum loss on any telephone line. Thus, initially amplifier 28 will reproduce the reference signal with a peak-to-peak amplitude appreciably in excess of 4 volts. It will be noted that since the reference signal occurs within the relatively short period of two pulses or 0.74 msec, it will be reproduced at the output of amplifier 38 even in the absence of compensating circuit 30. The output of amplifier 38 is coupled through capacitor 40 to terminal 44. If the reference signal output at terminal 44 rises above approximately +2.1 volts, then germanium diode 45 will conduct heavily. If the reference signal output at terminal 44 drops below approximately −2.1 volts, then germanium diode 45 will conduct heavily. At the termination of the first reference signal, limiter diode 46 charges capacitor 40 such that the potential at terminal 44 is approximately −2.1 volts. Since this is more negative than −1.5 volts, converter 48 provides a 00 output, which causes converter 50 to provide an output of −2 volts. This output is applied through resistor 42, and charges capacitor 40 to bring the potential at terminal 44 to −2 volts. the time-constant of resistor 42 and capacitor 40 is 0.7 msec which is small compared with the period of, for example, 100 msec between successive reference signals.

Each time that a reference signal at terminal 44 even slightly exceeds +2 volts, differential amplifier 61 provides a negative output pulse which is coupled through diode 63 and resistor 65 to charge capacitor 66 negatively. Each time that the output at terminal 44 is even slightly less than −2 volts, differential amplifier 62 provides a negative output pulse which is coupled through diode 64 and resistor 65 to charge capacitor 66 negatively. The negative output across AGC filter capacitor 66 reduces the gain of amplifier 28 from its maximum value. Thus after the occurrence of a few reference signals, the gain of amplifier 28 will be stabilized at its proper value so that the peak-to-peak amplitude of reference signals at terminal 44 will be precisely 4 volts with a positive excursion of +2 volts and a negative excursion of −2 volts. Once the output of converter 50 is thus synchronized with the output of converter 12, it will thereafter remain in step for all voltage levels.

At 0 msec, the output of amplifier 28 passes through +0.5 volt, as does the output of amplifier 38. The cutoff frequency of the filter comprising capacitor 40 and resistor 42 is approximately 230 Hz. The frequencies associated with the rise time of the unit step function are all appreciably greater than this; and the output of amplifier 38 is coupled through capacitor 40 to terminal 44 with no attenuation. Accordingly at 0 msec, the input to converter 48 passes through +0.5 volt; and its output changes from 11 to 10. This causes the output of converter 50 to change from 0 volts to +1 volt. The output from amplifier 38 thereafter decays in an oscillatory manner as shown by curve 38 of FIG. 4. However, the frequency of the damped oscillation is only 9 Hz, which is appreciably less than the 230 Hz cutoff frequency of the high-pass filter comprising capacitor 40 and resistor 42. Accordingly the voltage at terminal 44 will not vary appreciably from the 30 1 volt potential at which it is maintained by the output of converter 50. It will be appreciated that the output of converter 48 will remain constant unless the input at terminal 44 changes by more than ± 0.5 volt.

The maximum rate of voltage decay at the output of amplifier 38 occurs approximately 25 msec after the step function input, and is approximately 1 volt/23 msec. For capacitor 40, Q = CV; and C = C($dV/dt$). The maximum current through capacitor 40 is approximately $0.015(10)^{-6}/23(10)^{-3} = 0.65\ \mu a$. The voltage error at terminal 44 required to produce this current flow through resistor 42 is $0.65(10)^{-6}47(10)^{3} = 0.03$ volt.

In FIGS. 4 and 4*a*, the curve 44 represents the output at terminal 44. It will be noted in FIGS. 4 and **4*a* that curve 44** dips approximately 0.03 volt below +1 volt at 25 msec after the step function input.

The ripple frequency of waveform 38 between 0 msec and 6 msec is approximately one cycle per 4 msec or 250 Hz. The high-pass filter circuit comprising capacitor 40 and resistor 42 thus provides an attenuation of about 26 percent and a phase lead of about 42°. Assuming that the ripple in waveform 38 between 0 msec and 6 msec is ±0.04 volt, the ripple in waveform 44 between 0 msec and 5 msec is only ±0.03 volt. It will be appreciated that the ripple in waveform 44 is very small compared with an allowable tolerance of ±0.5 volt before converter 48 will provide an erroneous output. Waveform 44 has a ripple peak slightly before 2 msec, a dip at 3 msec, and a peak at 5 msec. A slight readjustment of capacitors 33 and **34*a* may be required to insure that the voltage at terminal 44** exhibits equal ripple above and below +1 volt between 0 msec and 5 msec. In the FIGS. 4 and 4*a* it will be noted that for time greater than 10 msec after the step-function input, the variation in waveform 44 from a nominally constant value of +1 volt is substantially 180° out of phase with waveform 35 representing the voltage across capacitor 35. Thus at approximately 57.5 msec, waveform 35 passes through zero; and waveform 44 passes through +1 volt.

It will be understood that the calibrate level of +2 volts may be omitted where digital input source 10 includes a randomizing circuit or scrambler. The digital output device 52 should then include a corresponding unscrambler. Where the calibrate level is not used, converters 12 and 50 need not be provided with a +2 volt input; and converter 48 need not be provided with a +1.5 volt input. Furthermore the plus input of differential amplifier 61 would be supplied with a +1 volt reference. Finally the cathode of limiter diode 45 would be coupled to +1 volt. Where input device 10 includes a scrambler, the output of converter 12 will be swept through its entire range of values from −2 volts to +1 volt even though the raw or unscrambled bits remain constant. In practice the raw or unscrambled bits are also a variable; and converter 12 will reach the extreme limits of −2 volts and +1 volt at aperiodic intervals which however are sufficiently frequent that differential amplifiers 61 and 62 will be able to maintain the proper gain for amplifier 28.

Referring now to FIG. 5, the digital input source 10 is again coupled to digital-to-analog converter 12. The output of converter 12 is coupled to a filter 14 having a pass band from 1,200 Hz to 4,000 Hz. The output of band-pass filter 14 is coupled to one input of a modulator 16 which is supplied with a second input from a 1,600 Hz oscillator 18. The sum frequency output of modulator 16 is extracted by a filter 20 having a pass band from 2,800 Hz to 5,600 Hz. The output of band-pass filter 20 is coupled to one input of a second modulator 22 the second input of which is supplied by a 2,600 Hz oscillator 24. The difference frequency output of modulator 22 is coupled through the telephone line 26 having a pass band from 200 Hz to 3,000 Hz.

The output from the telephone line is coupled to a first input of a modulator 22*a*, the second input of which is supplied by a 2,600 Hz oscillator 24*a*. The sum frequency output of modulator 22*a* is extracted by a filter 20*a* having a pass band from 2,800 Hz TO 5,600 Hz. The output of band-pass filter 20*a* is coupled to one input of modulator 16*a*, the other input of which is supplied by a 1,600 Hz oscillator 18*a*. The difference frequency output of modulator 16*a* is extracted by a filter 14*a* having a pass band from 1,200 Hz to 4,000 Hz.

The output of band-pass filter 14*a* is coupled through an equalizer 27*a* to the input of a variable gain amplifier 28*a*. The output of amplifier 28*a* is coupled to one input resistor (not shown) of a summing amplifier 38*b*. Summing amplifier 38*b* may have a construction similar to components 36, 37, 38, and 38*a* of FIG. 1. The output of summing amplifier 38*b* is coupled through capacitor 40*a* of circuit 41 to terminal 44. Capacitor 40*a* of circuit 41 is shunted by an inductor in series with a resistor. Terminal 44 is coupled to limiter 45*a*, to automatic gain control circuit 60, and to analog-to-digital converter 48. The output of automatic gain control circuit 60 is coupled to the gain control input of amplifier 28*a*. Limiter 45*a* includes germanium diodes 45 and 46 coupled to appropriate potentials as shown in FIG. 1. The automatic gain control circuit 60 of FIG. 5 is identical to that shown in FIG. 1. The output of converter 48 is coupled to digital-to-analog converter 50 and to a digital output circuit 52. The output of converter 50 is coupled to the input resistor of an inverting amplifier 32*c*, which may have a construction similar to components 31, 32, and 32*a* of FIG. 1. The output of inverting amplifier 32*c* is coupled through a low-pass filter 30*a* to the other input resistor of summing amplifier 38*b*. This other input resistor is shown as comprising a portion of a phase lead circuit 30*b*. As in FIG. 1, converters 12 and 50 are each provided with five voltage reference inputs ranging from −2 volts to +2 volts. Similarly coverter 48 is provided with four reference voltage inputs in the manner shown in FIG. 1. Finally, digital input 10 and digital output 52 provide five discrete digital values including a calibrate value. If desired digital input device 10 may include a scrambler; and digital output device 52 should include a corresponding unscrambler. In such event the circuit may be instrumented with only four discrete digital and analog levels.

Band-pass filters 14, 20, 20*a* and 14*a*, may all be of the sharp cutoff type. Filters 14 and 14*a* of FIG. 5, as well as the corresponding filters of all other transmitters and receivers should be adjusted to exhibit nearly identical changes in phase slope adjacent the lower cutoff frequency and to exhibit nearly identical changes in phase slope adjacent the upper cutoff frequency. Similarly band-pass filters 20 and 20*a* of FIG. 5, as well as the corresponding filters of all other transmitters and receivers, should be adjusted to exhibit nearly identical changes in phase slope adjacent the lower cutoff frequency and nearly identical changes in phase slope adjacent the upper cutoff frequency. Phase equalizer 27*a*, preferably includes a fixed phase equalizing portion which compensates for the changes in phase slope adjacent the limits of the pass band which is introduced by the sharp cutoff filters 14, 20, 20*a*, and 14*a*.

Equalizer 27*a* also includes an automatically self-adjusting portion which compensates for phase distortion introduced by the telephone line 26 and for residual phase distortion which is not compensated by the fixed portion of the equalizer. In order to obviate unduly stringent requirements upon equalizer 27*a*, band-pass filter 14 preferably includes an upper band edge rejection filter. The upper band edge notch filter may be tuned to 4,000 Hz, with a Q of 4. Thus the upper band edge notch filter may cause the amplitude response to fall off linearly from a value of nearly unity of 3,500 Hz to substantially zero at 4,000 Hz with a 50 percent amplitude response at 3,750 Hz.

As pointed out in FIG. 1 the band edge rejection filter may include a pair of serially connected notch filters to produce a somewhat more rapid S-shaped cutoff characteristic. In such event the Q's should be increased to approximately 8 so that the 50 percent amplitude response of the nominal cutoff is 3,750 Hz.

In operation of the circuit of FIG. 5, the pulse rate is 3,750 pulses per second; and the period for each pulse is 0.27 msec. Since four information levels are provided, there are two bits per pulse; and the digital information rate is 7,500 bits per second. Band-pass filter 14 suppresses all low-frequency signal components below 1,200 Hz. Only the band of high-frequency signal components extending from 1,200 Hz to 4,000 Hz is transmitted. The purpose of modulators 16 and 22 in conjunction with oscillators 18 and 24 and band-pass filter 20 is to shift the high-frequency signal components in the pass band of filter 14 down to the frequency band of 200 Hz to 3,000 Hz which can be accepted by the telephone line 26. It will be appreciated that this shifting of the frequency band downwardly by 1,000 Hz could not be accomplished by a single modulator in conjunction with an oscillator tuned to 1,000 Hz, since there would be interference between the upper and lower sidebands of the modulator output. In order to avoid such interference between the upper and lower sidebands in the modulator output, it is necessary that the oscillator frequency be somewhat greater than half the bandwidth of the telephone line. Since the bandwidth of the telepone line is 2,800 Hz, the minimum oscillator frequency to avoid interference between upper and lower sidebands in the modulator output is 2,800/2 = 1,400 Hz. A somewhat greater frequency of 1,600 Hz has been used for oscillators 18 and 18*a* in order to provide sufficient separation between the upper and lower sidebands in the modulator output that the desired sideband may be readily selected by the band-pass filters.

In the output of modulator 16, the upper sideband is selected by filter 20; and the lower sideband extends from −400 Hz to +2,400 Hz. Thus the lower sideband is folded about zero frequency and in effect extends from zero to 2,400 Hz. It will be noted that there is a 400 Hz separation between the upper frequency limit of the lower sideband at 2,400 Hz and the lower frequency limit of the upper sideband at 2,800 Hz. In the output of modulator 22, the lower sideband is selected by telephone line 26; and the upper sideband extends from 5,400 Hz to 8,200 Hz. It will be noted that there is a wide separation between the upper frequency limit of the lower sideband at 3,000 Hz and the lower frequency limit of the upper sideband at 5,400 Hz. In the output of modulator 22*a*, the upper sideband is selected by filter 20*a;* and the lower sideband extends from −400 Hz to +2,400 Hz. The lower sideband is folded about zero frequency and thus extends from zero to 2,400 Hz. It will be noted that there is a 400 Hz separation between the lower frequency limit of the upper sideband at 2,800 Hz and the upper frequency limit of the lower sideband at 2,400 Hz. In the output of modulator 16*a*, the lower sideband is selected by filter 14*a;* and the upper sideband extends from 4,400 Hz to 7,200 Hz. It will be noted that there is a 400 Hz separation between the upper frequency limit of the lower sideband at 4,000 Hz and the lower frequency limit of the upper sideband at 4,000 Hz.

Modulators 16, 22, 22*a* and 16*a*, are preferably Hall crystals, since the output voltage from a third crystal axis is equal to the product of the current along a first crystal axis and the magnetic flux along a second crystal axis. Each band-pass filter may be coupled to the current input along a first crystal axis; and each oscillator may be coupled to a winding which provides magnetic flux along a second crystal axis. It is preferable that the modulators be four-quadrant multipliers, such as Hall crystals, since this permits the minimum frequencies of the oscillators and the minimum frequency for the pass band of filters 20 and 20*a*.

However, it is possible to use two-quadrant multipliers such as balanced mixers, or even single-quadrant multipliers, such as diodes. Where balanced mixers are used, the frequencies of oscillators 18 and 18*a* may be increased to 4,200 Hz; the frequencies of oscillators 24 and 24*a* may be increased to 5,200 Hz; and the pass band of filters 20 and 20*a* should be from 5,400 to 8,200 Hz. The frequency of oscillator 18 should be appareciably greater than the upper frequency limit of band-pass filter 14. If the mixers are well balanced, no fundamental and especially no second harmonic of the oscillator frequency will be produced. The third harmonic of the oscillator frequency at 12,600 Hz in conjunction with the 4,000 Hz maximum frequency from filter 14 will produce a minimum difference frequency from modulator 16 of 8,600 Hz which is 400 Hz above the upper frequency limit of filter 20 at 8,200 Hz. Similarly oscillator 18*a* should have a frequency which is appreciably greater than the upper frequency limit of filter 14*a*. The third harmonic of the oscillator frequency at 12,600 Hz in conjunction with the 8,200 Hz maximum frequency from filter 20*a* will produce a minimum difference frequency from modulator 16*a* of 4,400 Hz which is 400 Hz above the upper frequency limit of filter 14*a*.

Where single-quadrant multipliers are used as modulators, both fundamental and especially second harmonic of the oscillator frequency will be produced. The frequency of oscillators 18 and 18*a* should be increased to 8,400 Hz; that is, appreciably greater than twice the upper frequency limit of filters 14 and 14*a*. The frequency of oscillators 24 and 24*a* should be increased to 9,400 Hz; and the pass band of filters 20 and 20*a* should be from 9,600 Hz to 12,400 Hz. The second harmonic of oscillator 18 at 16,800 Hz in conjunction with the 4,000 Hz maximum frequency from filter 14 will produce a minimum difference frequency from modulator 16 of 12,800 Hz which is 400 Hz above the upper frequency limit of filter 20 at 12,400 Hz. The second harmonic of oscillator 18*a* at 16,800 Hz in conjunction with the 12,400 Hz maximum frequency from filter 20*a* will produce a minimum difference frequency from modulator 16*a* of 4,400 Hz which is 400 Hz above the frequency limit of filter 14*a*.

Referring now to FIG. 6, assume that at time zero the output of converter 12 changes from zero to +1 volt, thus providing a unit step function input to band-pass filter 14. Since the nominal upper cutoff frequency of filter 14 is 3,750 Hz because of the provision of the upper band edge rejection filter, the output of filter 14 will change from zero +1 volt in a transient period of approximately 0.27 msec. This transient is shown as resembling an S-shaped waveform having a rise time of approximately 0.13 msec. Although the output of converter 12 remains constant at +1 volt, the output of filter 14 gradually decays since it does not pass any frequencies less than 1,200 Hz.

The output of filter 14 will change from +1 volt to 0 volts in a transient period of approximately 0.83 msec. This transient is shown as resembling an S-shaped curve having a decay time of approximately 0.41 msec. For band-pass filter 14, the ratio of the nominal upper cutoff frequency to the lower cutoff frequency is 3,750/1,200 = 3.1; while in FIG. 1, for telephone line 26, the ratio of the nominal upper cutoff frequency to the lower cutoff frequency is 2,700/200 = 13.5. Thus in FIGS. 5 and 6, the decaying transient associated with the lower cutoff frequency tends to overlap the rising transient so that the peak value of the waveform never quite reaches +1 volt. In FIG. 6 the waveform is shown as having the peak value of approximately 0.95 volt. Equalizer 27*a* should compensate for phase distortion over the frequency band from 1,250 Hz to approximately 3,750 Hz. Residual phase distortion at frequencies above 3,750 Hz causes little change in the waveform, since the amplitudes of these signal components are small. Residual phase distortion at frequencies below 1,250 Hz is again desirable since this delays the decaying transient so that it occurs almost entirely after the step.

In FIG. 5 as in FIG. 1, amplifier 28*a* has a maximum gain sufficiently in excess of unity to more than compensate for the maximum loss on any telephone line. Again, the automatic gain control circuit 60 responds to the reference signals provided by encoder 12 to stabilize the gain of amplifier 28*a* at it proper value, so that the peak-to-peak amplitude of reference signals at terminal 44 will be precisely four volts with a positive excursion of +2 volts and a negative excursion of −2 volts. Again, limiter 45*a* includes germanium diodes 45 and 46 respectively coupled to +2 volts and −2 volts as shown in FIG. 1.

In response to a unit step function input from encoder 12, the output of amplifier 28*a* will rise in the manner shown in FIG. 6. The output from amplifier 28*a* is coupled through summing amplifier 38*b* and the capacitor of circuit 41 to terminal 44. When the output of amplifier 28*a* rises through +0.5 volt, the output of converter 48 will change from 11 to 10, thus causing the output of converter 50 to change from zero volts to +1 volt. This step function output is applied to low-pass filter 30*a*. The output from filter 30*a* rises from zero volts to +1 volt in an S-shaped curve having a transient period of 0.83 msec with a rise time of approximately 0.41 msec. Thus low-pass filter 30*a* should provide a rising transient which is similar in shape to the decaying transient in the output of amplifier 28*a*. When filter 30*a* is properly adjusted, the output of summing amplifier 38*b* will rise from zero volts to +1 volt in a transient period of 0.27 msec with a rise time of approximately 0.13 msec and thereafter remain substantially at 1 volt.

Low-pass filter 30*a* may have a moderately sharp cutoff at approximately 1,200 Hz and may include a constant-k midsection with $m$-derived half setions at each end, where $m$ has approximately a 0.57 value. This is very close to a value of $m = 0.6$ which is usually used to give a nearly constant image impedance below the cutoff frequency. It is desired that the time delay be substantially one-half cycle or 180° at the cutoff frequency. If the low frequency time delay of the constant-$k$ midsection were maintained out to the cutoff frequency, the phase shift would be 2 radians. If the low frequency time delay of the two $m$-derived end half sections were maintained out to the cutoff frequency, the phase shift would be 1.14 radians. Thus the total extrapolated phase shift of the composite filter at the cutoff frequency would be $2+1.14 = 3.14$ radians or 180°. The time delay in the rising transient provided by filter 30*a* may be governed to some extent by varying the m values of the two terminating half sections. If the time delay is excessive, the m values may be reduced; and if the time delay is insufficient, the $m$ values may be increased.

Alternatively low-pass filter 30*a* may comprise one and one-half constant-$k$ sections. The filter will include two series inductors and two shunt capacitors, and may have either a series input inductor with a shunt output capacitor or a shunt input capacitor with a series output inductor. If the low frequency time delay of the filter were maintained out to the cutoff frequency, the phase shift would be 3 radians, or somewhat less than 180°. However there is some phase distortion which increases the phase shift at the cutoff frequency. The time delay of this filter can not be varied; and hence other means may be needed to govern the overall time delay.

The overall time day may be appreciably varied by providing phase lead or phase lag circuits. Phase lag to increase the time delay may be obtained by shunting the feedback resistor of inverter 32*c* with a capacitor; and inverter 32*c* would have a construction including a capacitor connected as 32*b* of FIG. 1.

A phase lead may be provided both by summing amplifier 38*b* and by inverter 32*c*. The 100K input resistor (37 of FIG. 1) of summing amplifier 38*b* driven by filter 30*a* may comprise two 50K resistors connected in series; and a phase lead capacitor may be connected from the output of filter 30*a* to the junction of these two resistors, to provide the phase lead circuit indicatd generally by the reference character 30*b*. Similarly, the 100K input resistor (31 of FIG. 1) of inverter 32*c* may comprise two 50K resistors connected in series; and a phase lead capacitor may be connected from the output of converter 50 to the junction of these two resistors. Such phase lead circuits produce a slightly rising characteristic in the pass band so that at 1,200 Hz, the amplitude response is somewhat in excess of its nominal value of unity. Each phase lead may range up to 9° with an excess amplitude of less than 4 percent at 1,200 Hz, and may range up to 12° with an excess amplitude of less than 8 percent at 1,200 Hz. In the stop band exceeding 1,200 Hz each phase lead circuit will have a maximum gain of only two at infinite frequency.

Capacitor 40*a* of synchronizing circuit 41 operates in conjunction with limiter 45*a* in the same manner that capacitor 40 of FIG. 1 operates in conjunction with limiter diodes 45 and 46. However, circuit 41 also includes a shunting circuit for capacitor 40*a* comprising an inductor connected in series with a resistor.

Assume that the gain of amplifier 28*a* is correct but that the receiving circuit is improperly synchronized with the transmitting circuit and that the output of amplifier 38*b* and hence converter 50 is 1 volt more positive than the output of encoder 12. If the output of encoder 12 remains at zero volts for more than 0.83 msec, the output from amplifier 28*a* will be zero; and the output of filter 30*a* will be −1 volt, producing a +1 volt output from amplifier 38*b*. If the output of encoder 12 changes from zero volts to +1 volt, the output of amplifier 28*a* will also change from zero volts to +1 volt thus causing the output of summing amplifier 38*b* to change from +1 volt to +2 volts. This produces a calibrate output from converter 48 which causes the output of converter 50 to change from +1 volt to +2 volts. During the 0.83 msec decaying transient, the output of amplifier 28*a* decreases from 1 volt back to zero volts; while at the same time the output from low-pass filter 30*a* changes gradually from −1 volt to −2 volts. During this period the output of summing amplifier 38*b* remains constant at +2 volts. If a calibrate signal is now provided from the digital input source 10, the output of encoder 2 will change from 1 volt to 2 volts; and the output of amplifier 28*a* will change from zero volts to 1 volt. This causes the output of summing amplifier 38*b* to change from 2 volts to 3 volts, thus causing terminal 44 to tend to rise above 2 volts. When the potential at terminal 44 exceeds 2.1 volts, diode 45 of limiter 45*a* conducts heavily to maintain terminal 44 at a potential of 2.1 volts. Thus the capacitor of circuit 41 will be charged to a potential of approximately 0.9 volt and with a polarity which causes the potential at terminal 44 to be less than the output of summing amplifier 38*b*. No change occurs in the outputs of converters 48 or 50; and the output of filter 30*a* remains at −2 volts. During the 0.83 msec decaying transient, the output of amplifier 28a gradual decreases from 1 volt to zero volts; and the output of amplifier 38*b* gradually decreases from 3 volts to 2 volts. It is desired that during this transient period of 0.83 msec capacitor 40*a* gradually discharge from 0.9 volt to zero volts in accordance with an S-shaped waveform similar to the decaying transient of FIG. 6. Thus the voltage at terminal 44 will remain nominally constant at +2 volts with a tolerance of ±0.1 volt. The operation of the circuit is proper whether the input from encoder 12 remains at the calibrate level from three pulse intervals, and hence for a period substantially equal to the decay period, or whether as shown in FIG. 2, the input from encoder 12 remains at the calibrate level for only one pulse interval of 0.27 msec. Thus, the receiver is synchronized to the transmitter; and the output of converter 50 will remain in step with the output of encoder 12 for all voltage levels.

An input signal comprising a positive-going unit pulse may be considered as the superposition of a positive unit step function at the leading edge of the pulse and a delayed negative unit step function at the trailing edge of the pulse. When the receiver is synchronized with the transmitter, the 0.83 msec decaying transients associated with the positive step function at the leading edge of the pulse and the negative step function at the trailing edge of the pulse are both provided by low-pass filter 30*a*. However, when the receiver is not in synchronism with the transmitter, then at the leading edge of a calibrate pulse, the synchronizing error is stored in capacitor 40*a;* and the 0.83 msec transient associated with the step function at the leading edge of this pulse is provided by the discharge of capacitor 40*a* through the inductor and resistor of circuit 41. The 0.83 msec transient associated with the step function at the trailing edge of the calibrate pulse is provided by low-pass filter 30*a*.

Capacitor 40*a* is directly charged by the output of summing amplifier 38*b* in conjunction with one of the diodes of limiter 45*a*. However, capacitor 40*a* serially discharges through the inductor and resistor of circuit 41. Assuming the 0.83 msec transient of filters 14 and 30*a* is of the S-shaped form shown in FIG. 6, then capacitor 40*a* in conjunction with the inductor of circuit 41 may have a series resonant frequency of approximately 500 Hz. The resistor of circuit 41 may provide approximately 0.6 of critical damping; and the Q of the series resonant circuit will accordingly be 0.83, approximately. Since circuit 41 is less than critically damped, the voltage across capacitor 40*a* will decay from 0.9 volt in an oscillatory manner and will exhibit a 9 percent overshoot of 0.08 volt at approximately 1.27 msec after a step function input where the receiver is not synchronized and capacitor 40*a* is charged through one of the diodes of limiter 45*a*. Capacitor 40*a* will thus discharge in the manner shown for curves 34 and 38 of FIG. 4, although with a much shorter time scale and with appreciably greater damping so that the overshoot is greatly reduced.

Pulse systems are usually analyzed by superposition as if each pulse provided its own spectrum independent of the spectra of the preceding and succeeding pulses. This method of analysis is accurate providing the digital input is random or is rendered random by a scrambler. Scramblers usually provide a random or semi-random key which is added to (or subtracted from) the raw digital input with a modulo equal to the number of voltage levels. For example, with four voltage levels, the addition would be modulo 4. If for one pulse the digital input is 2 and the scrambling key is 3, the resulting sum is 3+2 = 5, which is equal to 1 for modulo 4 addition. If for the successive pulse the digital input is 3 and the scrabling key is 1, then the resulting sum is 3+1 = 4, which is equal to 0 for modulo 4 addition. However, there is a small but finite probability that the random or semi-random scrambling key may be so related to the raw digital input that the resulting scrambled output of device 10 to encoder 12 comprises a repetitive pattern of pulses. In such event the output from encoder 12 will change from non-periodic to periodic. For only one cycle of a periodic output from converter 12, the spectrum is continuous; and while the spectrum may exhibit a maximum amplitude at the fundamental frequency, the energy at this frequency is a very small portion of the total energy of the spectrum. If the output of converter 12 is periodic for a very large number of cycles, then the spectrum is no longer continuous but instead comprises frequency components consisting solely of the fundamental and various harmonics thereof depending upon the shape of the periodic waveform of the output of encoder 12. The fundamental frequency will not stand out recognizably unless the output from encoder 12 continues periodic for at least six cycles.

In any digital transmission system, periodic waveforms are reproduced provided with fundamental frequency lies within the passs band. However, where the lower frequency components including the carrier are suppressed, as in the present invention, then periodic waveforms cannot be reproduced where the fundamental frequency lies below the lower limit of the pass band. For example, assume in FIG. 1, that the scrambled output from encoder 12 happens to be many cycles of a symmetrical square wave having a period of 14 pulses with an amplitude of +1 volt for 7 pulses and an amplitude of −1 volt for 7 pulses. The fundamental frequency is 2,700/14 = 193 Hz which lies below the lower limit of the pass band of telephone line 26. The telephone line will pass only the second and higher order harmonics of the fundamental frequency. For a symmetrical square wave there is, of course, no second harmonic; and the peak amplitude of the fundamental component is $4/\pi = 1.27$ volts. When the output of encoder 12 changes from −1 volt to +1 volt, the output from amplifier 28 will also change from −1 volt to +1 volt in a transient period of 0.37 msec with a rise time of approximately 0.18 msec. When the output of encoder 12 changes from +1 volt to −1 volt, the output from amplifier 28 will also change from +1 volt to −1 volt in a transient period of 0.37 msec with a rise time of 0.18 msec. However, during the period when the output of encoder 12 remains at +1 volt, the output from amplifier 28 will exhibit a negative half-cycle sinusoidal variation, and will decrease from +1 volt to −0.27 volt and then increase to +1 volt again. Similarly, during the period when the output of encoder 12 is −1 volt the output from amplifier 28 will exhibit a positive half-cycle sinusoidal variation, and will rise from −1 volt to +0.27 volt and thereafter decrease to −1 volt again. Circuit 30 will not compensate for this variation; and the high-pass filter comprising components 40 and 42, having a cutoff frequency of 230 Hz, will be unable to discriminate appreciably against this adverse variation. Thus, during the period when the output from encoder 12 is +1 volt, the output at terminal 44 will dip below +0.5 volt during the middle five clock pulse intervals. Similarly, during the period that the output of encoder 12 is −1 volt, the output at terminal 44 will rise above −0.5 volt during the middle five clock pulse intervals. This will produce an erroneous zero volt output from converter 50 during the middle five clock pulse intervals of each of the positive and negative portions of the symmetrical square wave.

The circuit of FIG. 1 will operate as well as any standard transmission system provided the period of any periodic output from encoder 12 is not more than 13 clock pulse intervals so that the fundamental frequency exceeds 2,700/13 = 208 Hz, which lies at the lower limit of the equalized pass band of the telephone line. The circuit of FIG. 5 will operate as well as any conventional transmission system if the period of any periodic output from encoder 12 does not exceed three clock pulse intervals so that the fundamental frequency is not less than 3,750/3 = 1,250 Hz. It will be noted that this fundamental frequency lies at the lower limit of the equalized pass band of filter 14.

Accordingly, it is preferable to exercise some supervision over the output of encoder 12 to prevent the occurrence of more than five cycles of a periodic waveform having a fundamental frequency lower than the lower cutoff frequency of either the telephone line in FIG. 1 or bandpass filter 14 in FIG. 5. One method of destroying periodicity in the output of encoder 12 is to periodically interrupt the normal information bit stream and insert a +2 volt calibrate level pulse.

Referring again to FIG. 1, the output of encoder 12 is coupled through a capacitor 12a to a low-pass filter 12b having a sharp cutoff at 200 Hz. The output of filter 12b is coupled to a squaring circuit 12c. The output of encoder 12 is applied to a high-pass filter 14c having a sharp cutoff at 200 Hz. The output of filter 14c is coupled to a squaring circuit 12d. Circuits 12c and 12d may each comprise a four-quadrant multiplier such as a Hall crystal. The input current applied to the current axis should also serially flow through the flux winding of the flux axis to insure that the current axis and flux axis inputs are in phase. A voltage output is taken along the third axis of each Hall crystal. Alternatively devices 12c and 12d may comprise a diode driven by an input not exceeding 30 millivolts. For such low level inputs, a diode will provide a square-law direct-current output. Squaring devices 12c and 12d will thus provide outputs proportional to the energy content of their input voltages. The output of device 12c is connected for positive polarity; and the output of device 12d is connected for negative polarity. The positive output of device 12c is connected through a summing resistor 10a to the input of a low-pass filter 10c; and the negative output of device 12d is connected through a summing resistor 10b to the input of filter 10c. Low-pass filter 10c may have a moderately sharp cutoff at approximately 50 Hz. The output of filter 10c is applied to digital input device 10 and interrupts the normal bit stream by providing a +2 calibrate pulse upon each twelfth clock pulse.

In FIG. 2, the four voltage levels representing information bits range from −2 volts to +1 volt so that the scrambled output of encoder 12, where the voltage levels are used with substantially equal frequency, will have a direct-current or zero frequency component of −0.5 volt. Capacitor 12a serves to block this direct-current component. In effect capacitor 12a functions as a high-pass filter having a very low cutoff frequency, such as 1 Hz or less. If all voltage levels were increased by +0.5 volt, then the direct-current or zero frequency component of the scrambled output of encoder 12 would be zero; and capacitor 12a may be omitted. Alternatively capacitor 12a may be replaced by a floating source of 0.5 volt potential, the negative terminal of which is connected to the output of encoder 12 and the positive terminal of which is connected to filter 12b. The random scrambled output of encoder 12 has a power spectrum which is the same of that of a single rectangular pulse. Thus the amplitude spectrum of the scrambled output of encoder 12 is the same as that of a single rectangular pulse except for the phase angles and polarities of the various component frequencies. The amplitude spectrum has a maximum amplitude of unity at zero frequency, a relative amplitude of 0.64 at half the pulse repetition frequency, and passes through zero amplitude at the pulse repetition frequency. The amplitude spectrum of a rectangular pulse resembles a damped cosine wave; and substantially all the energy is contained within the first quarter cycle which encompasses the frequency band ranging from zero up to the pulse repetition frequency.

Since the nominal upper cutoff frequency of the telephone line is 2,700 Hz, which is equal to the pulse repetition frequency, the telephone line passes nearly the entire energy spectrum of the output of encoder 12 except for the low frequency portion extending from zero up to 200 Hz. The cutoff frequency of high-pass filter 14c is 200 Hz; and filter 14c passes the entire energy spectrum of the output of encoder 12 except for the low frequency portion extending from zero to 200 Hz. While filter 14c might be provided with an upper cutoff to produce a band-pass characteristic identical to that of the telephone line, this is not necessary since the energy content of the output of high-pass filter 14c is only 9 percent greater than the energy transmitted through the telephone line 26. Squaring circuit 12d thus provides an output voltage proportional to the energy content of the higher frequency signal components transmitted through the telephone line.

Since low-pass filter 12b has a cutoff frequency of 200 Hz, the output of filter 12b contains all the suppressed low-frequency signal components except those in the small frequency band extending from zero to perhaps 1 Hz, which are blocked by capacitor 12a. Squaring circuit 12c provides an output which is equal to the energy content of the suppressed low-frequency signal components, the energy content of the narrow frequency band from zero to perhaps 1 Hz blocked by capacitor 12a being negligible.

Assuming that the average energy or power of the scrambled output of encoder 12 over the band from zero to infinite frequency is 100 percent, the energy or power in the frequency band from zero to 2,700 Hz is approximately 93 percent. Assuming that the first quarter cycle of the amplitude spectrum is a cosine (rather than a damped cosine) then the energy or power within the pass band from 200 Hz to 2,700 Hz will be approximately 79 percent; and the energy or power within the suppressed band from zero to 200 Hz will be approximately 14 percent. The energy or power in the output of high-pass filter 14c over the band from 200 Hz to infinite frequency is 86 percent.

So long as the scrambled output of encoder 12 continues random, the average or mean output voltages of squaring circuits 12c and 12d will have a ratio of approximately 14/86. If, however, the scrambled output of encoder 12 becomes periodic with a fundamental frequency less than 200 Hz, then the power spectrum will be gradually displaced from the pass band into the suppressed frequency band. The output of squaring circuit 12c will increase; while the output of squaring circuit 12d will decrease. The ratio of the output voltages of the squaring circuits will thus gradually increase appreciably above 14/86. For example, a symmetrical square wave output from encoder 12 having a fundamental frequency less than 200 Hz provides at most 20 percent of its total energy in the pass band and at least 80 percent of its total energy in the suppressed frequency band, so that the ratio of the output votlages of the squaring circuits may approach or exceed 80/20, where the symmetrical square wave continues periodic for a very large number of cycles.

In order to permit some displacement of energy from the pass band into the suppressed band, from the normal energy distribution of a completely random output from encoder 12, resistors 10a and 10b may have a ratio of 24/86. Thus, the average input to filter 10c will remain negative if the ratio of the output voltages of the squaring circuits is less than 24/86, while the average input voltage to filter 10c will become positive if the ratio of the output voltages of the squaring circuits is greater than this.

Squaring circuits 12c and 12d provide outputs in accordance with the instantaneous power of the voltages in the suppressed frequency band and in the pass band;

and their outputs include a direct-current component and a double frequency component, since the instantaneous power for any frequency component varies sinusoidally from zero to twice the average power. Since the minimum frequency of signals coupled through high-pass filter 14*c* to squaring circuit 12*d* is 200 Hz, the minimum ripple frequency in the output of squaring circuit 12*d* will be 400 Hz. Because low-pass filter 10*c* has a cutoff frequency of 50 Hz all double frequency ripple variations in the output of squaring circuit 12*d* will be rejected. The input of squaring circuit 12*c* lies in the frequency band from zero to 200 Hz; and the output of squaring circuit 12*c* will include not only a direct-current component but also a double frequency ripple component in the band from zero to 400 Hz. Low-pass filter 10*c* rejects all ripple frequencies greater than 50 Hz, so that the only ripple in the output of filter 10*c* will be due to suppressed signal components in the output of encoder 12 in the band from zero to 25 Hz. For a random output from encoder 12, the power or energy contained in the frequency band from zero to 25 Hz is approximately 1.7 percent. It will be appreciated that the outputs of squaring circuits 12*c* and 12*d* might first be individually filtered by low-pass filters identical in construction to filter 10*c;* and the outputs of the individual filters might then be combined through summing resistors 10*a* and 10*b*. The net effect of the use of two individual filters is the same as the construction shown. Where the alternate construction is employed, the output of the low-pass filter associated with squaring circuit 12*c* would comprise a direct-current component representing the mean or average power of suppressed signal frequencies in the band from 25 Hz to 200 Hz accompanied by a double frequency sinusoidal ripple component representing the instantaneous power of suppressed signal frequencies in the band from zero to 25 Hz. If the scrambled output of encoder 12 is random, the output of the low-pass filter associated with squaring circuit 12*c* will exhibit less than a ± 2 percent variation in instantaneous power from a mean or average power of 14 percent of that of the output of encoder 12. Accordingly, it is always desired that the ratio of resistors 10*a* and 10*b* be in excess of 16/86.

Low-pass filter 10*c* may comprise one and one-half constant-*k* sections. The filter will include two series inductors and two shunt capacitors, and may have either a series input inductor and hence a shunt output capacitor or it may have a shunt input capacitor and hence a series output inductor. Alternatively filter 10*c* may comprise a constant-*k* midsection with *m*-derived half sections at each end, where *m* has a 0.6 value. Because of the low cutoff frequency of only 50 Hz for filter 10*c*, the inductors of an L-C filter may be unduly bulky and heavy. Accordingly, filter 10*c* may comprise an active R-C filter employing resistors and capacitors in conjuction with amplifiers to produce an equivalent filter, in a manner well known to those skilled in the art. If the low-frequency time delay of the filter were maintained out to the cutoff frequency, the phase shift would be from 3 to 3.2 radians. This is approximately 180° or one-half cycle at the cutoff frequency. For a cutoff frequency of 50 Hz, the period for a full cycle is 0.02 second; andthe time delay of the filter is accordingly 0.01 second. This time delay corresponds to two full cycles of a periodic output from encoder 12 having a fundamental frequency of 200 Hz and to one full cycle of a 100 Hz fundamental frequency periodic output from encoder 12. It is desired that the time delay of filter 10*c* not exceed 0.025 second, corresponding to five full cycles at a frequency of 200 Hz, so that the output of filter 10*c* will respond to the diversion of energy into the suppressed frequency band within five cycles of a periodic output from encoder 12 having a fundamental frequency of 200 Hz.

It will be appreciated that circuits 12*c* and 12*d* may alternately comprise full-wave rectifiers driven by high-level inputs exceeding 1 volt. In such event the direct-current outputs of the rectifiers will be proportional, not to the power or energy content of their input voltages, but instead to the half-wave averages of the input voltages. Accordingly, circuits 12*c* and 12*d* would respond, not to the power or energy spectrum, but instead to the "amplitude spectrum". As previously pointed out, the amplitude spectrum of a random output from encoder 12 is the same as that of a single rectangular pulse except for phase angles and polarities. If a single rectangular pulse from encoder 12 is applied to telephone line 26, then the output pulse from the telephone line will have a shape as, for example, shown for the calibrate pulse of FIG. 2. The output pulse has sloping leading and trailing edges; and just reaches the +2 volt peak amplitude of the rectangular input pulse. If the nominal upper cutoff frequency of the telephone line were increased, then the slopes of the leading and trailing edges of the output pulse would increase; and the output pulse would have a flat-topped portion at +2 volts. If, however, the cutoff frequency of the telephone line were reduced, the slopes of the leading and trailing edges of the output pulse would decrease; and the peak amplitude of the output pulse would decrease below +2 volts. It will be noted that so long as the nominal upper cutoff frequency of the telephone line is 2,700 Hz or greater, the area under the output calibrate pulse (relative to the −2 volt level) is the same as the area under the rectangular input calibrate pulse (also relative to the −2 volt level). Since both the rectangular input pulse and the sloping-sided output pulse have identical "half-wave averages", they will produce identical outputs from the high-level rectifiers. Where circuits 12*c* and 12*d* comprise such high-level rectifiers, then only the amplitude spectrum from zero up to the pulse repetition frequency will affect their outputs. If a high-level full-wave rectifier were connected to the output of encoder 12, it would read 100 percent of the "average rectified output" of the encoder. Assuming that the amplitude spectrum of a random output from encoder 12 from zero to 2,700 Hz has the shape of a cosine (rather than a damped cosine), then high-level rectifier 12*c*, which responds to that portion of the amplitude spectrum from zero to 200 Hz, will provide an output of approximately 12 percent of the average rectified output of the encoder; and high-level rectifier 12*d*, which responds to that portion of the amplitude spectrum from 200 Hz to at least 2,700 Hz, will provide an output of 88 percent of the average rectified output of the encoder. Resistors 10*a* and 10*b* should have values appreciably in excess of the ratio 12/88, as for example, 19/88.

The outputs from full-wave, high-level rectifiers 12*c* and 12*d* contain not only a direct-current component but also ripple components at even multiples of the input frequencies. Since high-pass filter 14*c* has a cutoff at 200 Hz, the minimum ripple frequency from full-wave rectifier 12*d* will be 400 Hz; and this is rejected by filter 10*c*. However, for input frequencies less than 25 Hz full-wave rectifier 12*c* will provide an output ripple frequency less than 50 Hz; and this will not be rejected by low-pass filter 10*c*. If the outputs of full-wave rectifiers 12*c* and 12*d* were first filtered before being combined by summing resistors 10*a* and 10*b*, then th output of the low-pass filter associated with full-wave rectifier 12*c* would contain a direct-current component proportional to the average rectified output over the frequency band from 25 Hz to 200 Hz and a further component in accordance with the instantaneous rectified output over the frequency band from zero to 25 Hz. The frequency band from zero to 25 Hz contains approximately 1.5 percent of the average rectified output of the encoder. The instantaneous peak amplitude is approximately 1/0.636 = 57 percent greater than this. If the output from encoder 12 is random, the output of the low-pass filter associated with full-wave, high-level rectifier 12*c* will exhibit less than a +1 percent increase in instantaneous output from a mean output which is 12 percent of the average rectified output of the encoder. Accordingly, it is desired that the ratio of resistors 10*a* and 10*b* always be in excess of 13/88.

When the output of low-pass filter 10*c* becomes positive, the digital input device 10 interrupts the normal bit stream upon each twelfth clock pulse and instead provides a calibrate pulse which is at a level of +2 volts. The bit stream will then comprise 11 information pulses, one calibrate pulse, 11 information pulses, and one calibrate pulse, etc. Since the +2 volt calibrate pulse lies at one extreme of the range of voltage levels, it is highly probable that the output of encoder 12 will have a 2,700/12 = 225 Hz fundamental frequency which lies above the 208 Hz lower limit of the equalized pass band. This will divert energy back into the pass band, and would ultimately eliminate all energy in the suppressed frequency band.

However, when sufficient energy has been diverted into the pass band from the suppressed frequency band so that the ratio of energies in the suppressed and pass bands is equal to that of resistors 10*a* and 10*b*, the output of low-pass filter 10*c* will become negative. When this occurs, digital input source 10 provides a bit stream which is uninterrupted, except for periodic reference signals to control the gain of amplifier 28.

It will be understood that there are three frequency bands of interest. The first frequency band extends from zero to the upper cutoff frequency of the pass band at 2,700 Hz. Alternatively this first frequency band may be considered to extend from zero to infinite frequency as provided by the output of encoder 12. Where devices 12*c* and 12*d* are squaring circuits, the energy content in the frequency band from zero to 2,700 Hz is only 7 percent less than the total energy output of encoder 12. The second frequency band of interest is the pass band from 200 Hz to 2,700 Hz. Alternatively, the second frequency band may be considered to extend from 200 Hz to infinite frequency. This latter alternative has been shown in FIG. 1, since filter 14*c* has merely a high-pass characteristic rather than a band-pass characteristic corresponding to that of the telephone line. The third frequency band of interest is the suppressed band from zero to the lower cutoff frequency of the pass band at 200 Hz.

The ratio of the energy in the suppressed frequency band to that in the pass band may be implicitly determined by the ratio of energies in any two of the three frequency bands of interest. For example, the energy in the suppressed frequency band may be compared with the total energy output of encoder 12. In such event high-pass filter 14*c* may be omitted; and the output of encoder 12 may be connected to circuit 12*d* through a capacitor similar to 12*a*, which blocks the 0.5 volt direct-current offset in the encoder voltage levels. Where devices 12*c* and 12*d* are squaring circuits, resistors 10*a* and 10*b* should have a ratio in excess of 14/100. Considering that devices 12*c* and 12*d* will now both be subjected to frequencies less than 25 Hz, resistors 10*a* and 10*b* should have a ratio in excess of 16/102, as for example 24/110. Where devices 12*c* and 12*d* are full-wave, high-level rectifiers, resistors 10*a* and 10*b* should have a ratio in excess of 12/100. Considering that devices 12*c* and 12*d* will now both be subjected to frequencies less than 25 Hz, resistors 10*a* and 10*b* should have a ratio in excess of 13/101, as for example 19/107.

A third alternative is to compare the total energy output of encoder 12 with the energy in the pass band. This may be done merely by omitting low-pass filter 12*b*. Where devices 12*c* and 12*d* are squaring circuits, resistors 10*a* and 10*b* should have a ratio in excess of 100/86. Considering the effect of ripple, the resistors should have a ratio in excess of 102/86, as for example 110/86. Where devices 12*c* and 12*d* are full-wave, high-level rectifiers, resistors 10*a* and 10*b* should have a ratio in excess of 100/88. Considering the effects of ripple, the resistors should have a ratio in excess of 101/88, as for example 107/88.

In FIG. 5 the output of band-pass filter 14 may be directly applied to device 12*d*; and the output of encoder 12 may be coupled through a capacitor (similar to 12*a*) and a low-pass filter to device 12*c*. However, in FIG. 5 the low-pass filter corresponding to filter 12*b* should have a sharp cutoff at 1,200 Hz. Thus the energy in the suppressed frequency band may be compared with the the energy in the pass band. Alternatively the energy in the suppressed frequency band may be compared with the total energy output of the encoder, or the total energy output of the encoder may be compared with the energy in the pass band of filter 14. In FIG. 5 the ratio of resistors 10*a* and 10*b* must be changed from that specified in connection with FIG. 1, since a much larger portion of the energy spectrum of a random output from encoder 12 lies in the suppressed frequency band while a smaller portion of the energy spectrum lies in the pass band. In FIG. 5, the low-pass filter corresponding to 10*c* should have a cutoff frequency of approximately 300 Hz. The time-delay of this low-pass filter should be approximately one-half cycle at the cutoff frequency, which corresponds to two full cycles of a 1,200 Hz periodic output from encoder 12 and to one full cycle of a 600 Hz periodic output from encoder 12. In FIG. 5, for very low signal frequencies less than 150 Hz, the output from circuit 12*c* will contain double frequency ripple at less than 300 Hz which cannot be rejected by low-pass filter 10*c*. Where devices 12*c* and 12*d* are squaring circuits the frequency band from zero to 150 Hz contains 7.4 percent of the total energy output of the encoder; and where devices 12*c* and 12*d* are full-wave rectifiers, this frequency band contains 6.3 percent of the average rectified output of the encoder. This increase in ripple in the output of low-pass filter 10c should also be taken into consideration in selecting the ratio of resistors 10a and 10b in FIG. 5.

In FIG. 5, when the output of the low-pass filter 10c, which now has a cutoff frequency of 300 Hz, becomes positive, digital input device 10 interrupts the normal bit stream and provides a calibrate pulse upon each third clock pulse. Thus the output of encoder 12 will comprise two information pulses, one calibrate pulse, two information pulses, and one calibrate pulse, etc. Since the +2 volt calibrate pulse lies at one extreme of the voltage levels from encoder 12, it is highly probable that this will provide an encoder output containing a 3,750/3 = 1,250 Hz fundamental frequency. Energy is thus diverted from the suppressed frequency band into the pass band; and the output of filter 10c will become negative when the ratio of energies in the suppressed and pass bands is equal to that of resistors 10a and 10b. When the output of low-pass filter 10c becomes negative, digital input source 10 provides an uninterrupted bit stream.

While there is a high probability that the periodic interruption of the normal bit stream by the +2 volt calibrate pulse would produce a periodic output from the encoder having a fundamental frequency in the pass band, it is possible that the scrambled information pulses which occur intermediate the calibrate pulses may yield a periodic output from encoder 12 having a fundamental frequency of half the expected value and which lies in the suppressed frequency band. For example, in FIG. 5 the expected fundamental frequency of a periodic output from encoder 12 produced by a +2 volt calibrate pulse upon each third clock pulse is 1,250 Hz. However, it is possible that encoder 12 will provide a periodic output having a fundamental frequency of only 625 Hz. Assume in FIG. 5 the following sequence of calibrate and information pulses: +2, +1, +1, +2, −2, −2, +2, +1, +1, +2, −2, −2, and +2. It will be noted that this sequence of pulses comprises two full cycles of a periodic waveform having a fundamental frequency of 625 Hz. The positive portions ofthe waveform comprise a pair of adjacent +2 volt calibrate pulses and the two intermediate +1 volt information pulses. The negative portions of the waveform comprise the two adjacent −2 volt information pulses. The waveform contains appreciable second harmonic content at 1,250 Hz because of the presence of the calibrate pulses. Similarly in FIG. 1 the nature of the random output from encoder 12 may be such that the insertion of a +2 volt calibrate pulse on each twelfth clock pulse results in a periodic output from encoder 12 having a fundamental frequency of 112.5 Hz, which contains appreciable second harmonic at 225 Hz.

The occurrence of a periodic output from the encoder of half the expected frequency can be avoided by providing an additional −3 volt calibrate level. As shown in FIG. 5 the transmitting encoder or converter 12 is provided with a −3 volt input; and the receiving digital-to-analog converter 50 is also provided with a −3 volt input. The analog-to-digital converter 48 of the receiver is provided with a −2.5 volt reference input. For inputs between −1.5 volts and −2.5 volts, converter 48 provides a digital output of 00, while for inputs more negative than −2.5 volts, converter 48 provides a digital output indicative of the negative calibrate level. Similar provisions are made in FIG. 1. Furthermore diode 46 is now provided with an anode input of −3 volts; and the minus input of differential amplifier 62 of the automatic gain control 60 should be provided with a −3 volt reference input. Corresponding changes should be made in the automatic gain control circuit 60 and limiter 45a of FIG. 5. It will be noted that the +2 volt calibrate signal lies at one extreme of the voltage levels while the −3 volt calibrate signal lies at the other extreme of the voltage levels. The 10 Hz reference signal may now consist of a +2 volt calibrate pulse followed by a −3 volt calibrate pulse. This will sweep the encoder through its extreme range of outputs. Alternatively the reference signal may consist of a −3 volt calibrate pulse followed by a +2 volt calibrate pulse.

In FIG. 1, when the output from filter 10c becomes positive, digital input source 10 may interrupt the normal bit stream upon each sixth clock pulse and alternately provide one of the two calibrate pulses. The output of encoder 12 will thus proceed as follows: one +2 volt calibrate pulse, five random information pulses ranging between −2 volts and +1 volt, one −3 volt calibrate pulse, five information pulses, one +2 volt calibrate pulse, five information pulses, one −3 volt calibrate pulse, five information pulses, and one +2 volt calibrate pulse again. This sequence of pulses comprises two full cycles of a periodic waveform having a fundamental frequency of 225 Hz. Since the calibrate pulses lie at the extreme limits of the available voltage levels, no lower fundamental frequency can occur irrespective of the sequence of the information pulses. The reference signal may be used in FIG. 1, since filter 10c will most probably cause interruption of the bit stream at an average rate appreciably less than ten times per second. In FIG. 1 the alternate provision of positive and negative calibrate pulses for each sixth clock pulse reduces the information rate by only 17 percent.

In FIG. 5, when the output of filter 10c becomes positive, digital input source 10 may interrupt the normal bit stream upon third clock pulse and sequentially provide the two calibrate pulses in the same order. The output of encoder 12 may thus proceed as follows: one random information pulse, one +2 volt calibrate pulse, one −3 volt calibrate pulse, one information pulse, one +2 volt calibrate pulse, one −3 volt calibrate pulse, and one information pulse again. The two calibrate pulses are always provided in a positive-negative order. This sequence of pulses comprises two full cycles of a periodic waveform having a fundamental frequency of 1,250 Hz. No lower fundamental frequency can occur irrespective of the information pulses, which range only between −2 volts and +1 volt. Alternatively the output of encoder 12 may proceed as follows: one random information pulse, one −3 volt calibrate pulse, one +2 volt calibrate pulse, one information pulse, one −3 volt calibrate pulse, one +2 volt calibrate pulse, and one information pulse again. In this case the two calibrate pulses are always provided in a negative-positive order. The reference signal need not be used in FIG. 5, since filter 10c will most probably cause interruption of the bit stream at an average rate of at least 10 times per second. In FIG. 5, the sequential provision of the two calibrate pulses upon each third clock pulse momentarily reduces the information rate by 67 percent. However, the bit stream need be thus interrupted only occasionally; and only one or two cycles of the 1,250 Hz periodic waveform will be required to divert sufficient energy back into the pass-band to restore normal operation with an uninterrupted bit stream.

Advantageously, filter 10*c* may control only the +2 volt calibrate pulse, since this alone will be sufficient on most occasions to produce the expected fundamental frequency. The −3 volt calibrate pulse can then be controlled by another filter (10*f* of FIG. 5) on those rare occasions where the use of the +2 volt calibrate pulse alone yields half the expected fundamental frequency. Referring now to FIG. 5, the output of detecting circuit 12*c* is coupled through a summing resistor 10*d* to the input of a low-pass filter 10*f*. The output of detector 12*d* is coupled through summing resistor 10*e* to the input of filter 10*f*. Summing resistors 10*d* and 10e may have a ratio of values which is the same as, or perhaps somewhat greater than, that of resistors 10*a* and 10*b*. Low-pass filter 10*f* may have a moderately sharp cutoff at 120 Hz and may be of a construction similar to filter 10*c*. When used in FIG. 1, filter 10*f* may have a cutoff at 20Hz. Thus filter 10*f* may have a cutoff frequency of approximately 40 percent of that of filter 10*c*.

When the output from encoder 12 becomes periodic with a fundamental frequency less than the lower cutoff of the pass band, filter 10*c* will initially respond to the excessive ratio of signals (whether of energy content or of amplitude content) in the suppressed and pass bands and periodically provide the +2 volt calibrate pulse. If there results a fundamental frequency of half the expected value, then filter 10*f* will subsequently respond to periodically provide the −3 volt calibrate pulse. The positive and negative calibrate pulse should alternate in the manner previously described.

In FIG. 1, only signal frequencies in the band from zero to 10 Hz will cause ripple in the output of filter 10*f*; and in FIG. 5, only signal frequencies in the band from zero to 60 Hz will cause ripple in the output of filter 10*f*. Even if resistors 10*d* and 10*e* have the same ratio as resistors 10*a* and 10*b*, filter 10*f* requires a slightly greater diversion of signals into the suppressed band to produce a positive output than does filter 10*c*. This slight "amplitude delay" of filter 10*f* as compared with filter 10*c*, occasioned by the increased ripple rejection, may be further enhanced by providing a somewhat increased ratio of values for resistors 10*d* and 10*e*. Furthermore, the time delay of filter 10*f* is five cycles at the lower cutoff frequency of the pass band, while filter 10*c* has a time delay of only two cycles at this frequency. Hence the response of filter 10*f* is delayed both in amplitude and in time as compared with that of filter 10*c*.

It will be appreciated that alternatively filter 10*c* may control only the −3 volt calibrate pulse, and filter 10*f* may control only the +2 volt calibrate pulse. By separately controlling the negative and the positive calibrate pulses with different delays, either in time or both in amplitude and in time, there results a reduced loss in information rate where the output of encoder 12 becomes periodic with a fundamental frequency less than the lower cutoff of the pass band. The outputs of filters 10*c* and 10*f* are applied to separate and distinct inputs of the digital input device 10 which respectively control the positive and negative (or the negative and positive) calibrate pulses.

The principle shown in FIG. 5, may be extended. For example, the pass band of filter 14 may be from 2,300 Hz to 5,100 Hz. The upper band edge rejection filter associated with band-pass filter 14 may be such that the amplitude response falls off from substantially unity at 4,500 Hz to zero at 5,100 Hz, with a 50 percent response at 4,800 Hz. The pulse repetition frequency may be 4,800 pulses per second; and for two bits per pulse, the information rate is 9,600 bits per second. The frequency conversion can be accomplished in a single stage. Oscillator 18 may provide a frequency of 2,100 Hz. Components 20, 22, and 24 may be omitted; and the output of modulator 16 may be connected directly to the telephone line 26. The upper side band output of modulator 16 will be from 4,400 Hz to 7,200 Hz; and this will be rejected by the telephone line. Similarly in the receiver, components 20 *a*, 22*a*, and 24*a* may be omitted; and the output from the telephone line 26 may be connected directly to modulator 16*a*. Oscillator 18*a* may also provide a frequency of 2,100 Hz; and filter 14*a* should have a pass band from 2,300 Hz to 5,100 Hz. The difference frequency output of modulator 16*a* will be from −900 Hz to 1,900 Hz. This lower side band output is folded about zero frequency and thus extends from zero to 1,900 Hz. The undersired lower side band output of modulator 16*a* will be rejected by filter 14*a*. Equalizer 27*a* should compensate for phase distortion over the frequency band from 2,400 Hz to approximately 4,800 Hz. With a pulse frequency of 4,800 pulses per second, the fundamental of a repetitive square wave output from encoder 12 will be 2,400 Hz, as where the output of encoder 12 alternates between any given two voltage levels on successive pulses. It will be noted that this fundamental frequency of 2,400 Hz for a square wave output lies at the lower limit of the equalized pass band of filter 14. The peak amplitude of the output pulse from amplifier 28*a* will be approximately 0.9 volt. Although this is somewhat less than the 0.95 volt value shown in FIG. 6, the output from amplifier 28*a* passes through the +0.5 volt level at the proper time and with a sufficient amplitude margin to trigger a change in the output of converter 48, and hence in the output of converter 50. The resulting rising transient from filter 30*a* compensates for the decaying transient in the output of amplifier 28*a* so that the output of summing amplifier 38*b* will increase by exactly 1 volt in a transient period of 0.21 msec with a rise time of approximately 0.10 msec as determined by the nominal upper cutoff frequency of 4,800 Hz for filter 14. If the step input is 5 volts (−3 volts to +2 volts), the output waveform from amplifier 28*a* will have a peak amplitude of only 0.9 (5) = 4.5 volts. This is only sufficient to insure that the output of converter 50 changes from −3 volts to +1 volt. Assume for the moment that the low-pass filter 30*a* provides the desired compensating signal so that the output from amplifier 38*b* changes from −3 volts to +2 volts and thereafter remains at +2 volts. During the rising transient from amplifier 38*b*, the output from converter 50 will rapidly and successively change from −3 volts to −2 volts, then to −1 volt, then to zero volts, then to +1 volt, and finally to +2 volts. The change from −1 volt to 0 volts occurs at time zero. The change from −2 volts to −1 volt precedes time zero by the same amount that the change from 0 volts to +1 volt follows time zero. The initial change from −3 volts to −2 volts precedes time zero by the same amount that the final change from +1 volt to +2 volts follows time zero. Low-pass filter 30*a* tends to integrate these changes and hence provides an output substantially the same as if the output of converter 50 suddenly jumped from −3 volts to +2 volts at time zero. Thus filter 30*a* does indeed provide the desired compensating signal irrespective of the magnitude of the step function input. Where the scrambled output of encoder 12 becomes periodic with a fundamental frequency of less than 2,300 Hz, low-pass filter 10c will produce a positive output which completely interrupts the normal bit stream to provide alternate positive and negative calibrate pulses. The fundamental frequency is 2,400 Hz. Since no information pulses are provided, the information rate is momentarily reduced to zero. However, such interruption will be relatively infrequent; and only one or two cycles of alternating positive and negative calibrate pulses will be required to restore a normal energy ratio in the pass and suppressed frequency bands.

The principle shown in FIG. 5 may be further extended. For example, filter 14 may have a pass band from 2,600 Hz to 5,400 Hz, and may have an upper band edge rejection filter such that the amplitude response falls off from substantially unity at 5,000 Hz to zero at 5,400 Hz, with a 50 percent amplitude response at a nominal cutoff frequency of 5,200 Hz. The pulse repetition frequency may be 5,400 pulses per second, so that for two bits per pulse, the information rate will be 10,800 bits per second. Equalizer *27a* should compensate for phase distortion over the frequency band from 2,700 Hz to approximately 5,300 Hz. For a pulse frequency of 5,400 pulses per second, the associated fundamental frequency is 2,700 Hz, as where the output of encoder 12 alternates between any given two voltage levels on successive pulses. It will be noted that this fundamental frequency of a square wave output from encoder 12 lies at the lower limit of the equalized pass band of filter 14.

The principle of FIG. 5 may be further extended. For example, the pass band of filter 14 may extend from 2,900 Hz to 5,700 Hz. The upper band edge rejection filter of band-pass filter 14 may cause the amplitude response to fall from substantially unity at 5,300 Hz to zero at 5,700 Hz, with a 50 percent response at a nominal cutoff frequency of 5,500 Hz. Equalizer 27a should compensate for phase distortion over the frequency band from 3,000 Hz to approximately 5,600 Hz. The pulse repetition frequency may be 6,000 pulses per second; and for two bits per pulse, the information rate is 12,000 bits per second. If desired, eight discrete information voltage levels may be provided ranging for example from −4 volts to +3 volts. The positive calibrate level may be +4 volts; and the negative calibrate level may be −5 volts. With such construction there will be three bits per pulse; and the information rate will be 18,000 bits per second. With a pulse repetition frequency of 6,000 pulses per second, the fundamental frequency of a square wave output from encoder 12 comprising two pulses per cycle will be 3,000 Hz, which lies at the lower limit of the equalized pass band of filter 14.

In order to simplify the explanation, it has been assumed up to this point that the step function response of an equalized band-pass filter having a sharp lower cutoff and a sloping upper cutoff comprises a rising transient having a period of one cycle at the nominal upper cutoff frequency and a delayed decaying transient having a period of one cycle at the lower cutoff frequency. However in practice there will occur transient oscillations at the nominal upper cutoff frequency and at the lower cutoff frequency. Transient oscillations at the upper cutoff or nominal upper cutoff frequency occur in conventional pulse transmission systems; and any adverse interference between pulses is obviated by sampling at the mid-point of each pulse where the transient oscillations from preceding and succeeding pulses pass through zero, provided the phase equalizer substantially corrects for phase distortion.

Where, as in the present invention, the lower frequency signal components including the carrier are suppressed, there will also occur an oscillatory transient at the lower cutoff frequency. Thus a step function input will decay, not in accordance with the S-shaped curves 28 of FIG. 3 and 28a of FIG. 6, but instead in an oscillatory manner somewhat similar to that for curves 34 and 38 of FIG. 4. In FIG. 1, the frequency of this transient oscillation is 200 Hz. At this frequency, integrator 34 will provide a phase shift of slightly less than 90°; and the low-pass filter comprising components 33, 33a, and 33b will provide a phase shift appreciably less than 90°. In order that compensating circuit 30 provide a total phase shift of 180° at the transient oscillating frequency of 200 Hz, feedback resistor 32a of amplifier 32 may be shunted by a phase lag capacitor 32b having a value of approximately 0.0047 u so that the time-constant of capacitor 32b and resistor 32a is approximately 0.47 msec. The output of amplifier 38 will then be substantially free from transient oscillation at the lower cutoff frequency of the pass band. In FIG. 5, allowing each step function input, the output of amplifier 28a will decay in a transient oscillation having a frequency of 1,200 Hz. However, low-pass filter 30a will also produce a transient oscillation following each step function change in the output of converter 50. The design cutoff frequency of filter 30a,which is approximately 1,200 Hz, should be selected to produce a transient oscillating frequency of exactly 1,200 Hz. The phase lead capacitors of circuit 30b and of the input circuit of inverting amplifier 32c (or the phase lag capacitor of the feedback circuit of inverting amplifier 32c) should be adjusted so that the transient oscillation of filter 30a is 180° out of phase with the decaying transient oscillation from amplifier 28a. Thus summing amplifier 38b will provide an output substantially free from transient oscillation at the lower cutoff frequency of the pass band.

The fact that the decaying transient is oscillatory will not impair the functioning of compensating circuit 30 of FIG. 1. Waveform 28 will pass through zero at approximately 4 msec and will exhibit a peak overshoot at approximately 5 msec. Waveform 33 will also be oscillatory and will pass through zero at approximately 5 msec. Thus between zero and 5 msec, waveform 33 will closely resemble a half cycle of a damped sine wave. While this will change the shape of the ripple in waveform 38 between 0 msec and 6 msec, proper adjustment of capacitors 33, 34a and 32b will yield a comparable magnitude of the ripple relative to +1 volt.

Referring now to FIG. 7, there is shown a further embodiment which is alternative to that of FIG. 5. The output of variable gain amplifier 28a is again coupled to summing amplifier 38b. The output of amplifier 28a is also coupled to a compensating circuit 30c. Compensating circuit 30c is of similar construction to circuit 30 of FIG. 1, except that capacitors 33, 34a, and 32b should have values approximately one-sixth of those shown. It will be understood that circuit 30 compensates for a 200 Hz lower cutoff frequency of the pass band while circuit 30c compensates for a 1,200 Hz lower cutoff frequency of the pass band; and these cutoff frequencies have a ratio of 200/1,200 =1/6. The output of circuit 30*c* is coupled to summing amplifier 38*b*. The output of amplifier 38*b* is connected through a circuit 41*a* to terminal 44. Circuit 41*a* comprises a series capacitor shunted by an inductor in series with a resistor. Terminal 44 is connected to limiter 45*a*, automatic gain control circuit 60, and analog-to-digital converter 48. The output of AGC circuit 60 controls the gain of amplifier 28*a*. The output of converter 48 is coupled to digital-to-analog converter 50 and to digital output device 52. The output of converter 50 is applied to inverting amplifier 32*c* which drives a low-pass filter 30*d*. Filter 30*d* comprises a series input impedance, consisting of an inductor in series with a resistor, and a shunt output capacitor. The output of filter 30*d* is applied to a third 100 K input resistor (not shown) of summing amplifier 38*b*.

In operation of the circuit of FIG. 7, compensating circuit 30*c* supplies the suppressed signal components in the band from 1,200 Hz to approximately 54 Hz. Omitting from consideration for the moment the effect of filter 30*d*, the output of summing amplifier 38*b* would decay in a transient oscillation having a frequency of 54 Hz, or six times that of FIG. 1.

In FIG. 1, the 230 Hz cutoff frequency of capacitor 40 and resistor 42 is approximately 8.5 percent of the nominal cutoff frequency of the pass band at 2,700 Hz. In FIG. 3, during the period between −0.185 msec and 0 msec, curve 38 rises in a substantially square-law fashion from zero to +0.5 volt. During this period, the output of converter 50 is 0 volts. The mean voltage across resistor 42 during this period is 0.5/3 =0.167 volt; and the mean current therethrough is $0.167/47(10)^3 = 3.5\ \mu a$. This current flows through capacitor 40; and during this period, the charge is $0.185(10)^{-3}3.5(10)^{-6} = 0.65(10)^{-9}$ coulomb. The change in voltage across capacitor 40 and hence the voltage error at terminal 44 will thus be $0.65(10)^{-9}/0.015(10)^{-6} = 0.043$ volt, which is small compared with a maximum permissible tolerance of ± 0.5 volt. During the period between 0 msec and +0.185 msec, curve 38 rises from +0.5 to +1 volt; and the output of converter 50 is +1 volt. During this period capacitor 40 is recharged so that at +0.185 msec, the voltage error at terminal 44 is zero again. It will be noted that circuit 40–42 acts as a high-pass filter for inputs from amplifier 38, and acts as a low-pass filter for inputs from converter 50. In FIG. 1, the ratio of the cutoff frequency of filter 40–42 to the transient oscillating frequency is 230/9 = 25.

If the same principle were applied in FIG. 7, then filter 40–42 would have a cutoff frequency of 0.085 (3,750) = 320 Hz; and the voltage error at terminal 44 at the midpoint of the rising transient for a 1 volt step function input would again be 0.043 volt. The ratio of the cutoff frequency of filter 40–42 to the transient oscillating frequency would be 320/54 = 6. This indicates that in FIG. 7 filter 40–42 would provide less than one-quarter as much discrimination against the transient oscillating frequency as in FIG. 1. Accordingly in FIG. 7, the ripple in curve 44 due to the transient oscillation would be −0.125 volt for a +1 volt step input and −0.375 volt for a +3 step input from −2 volts to +1 volt. This ripple is uncomfortably close to the maximum permissible tolerance of ±0.5 volt, and may cause an erroneous output from converter 48 in the presence of other disturbances such as noise and interference between pulses due to inadequate phase equalization.

In FIG. 7, the purpose of filter 30*d* is to provide a compensating signal which neutralizes the 54 Hz transient oscillation of circuit 30*c* and provides the suppressed low frequency signal components in the band from approximately 54 Hz to 0 Hz, including the carrier or direct-current component. Since the overshoot of circuit 30*c* is approximately one-third of the step input, low-pass filter 30*d* may have a damping factor of 0.3, approximately. In order to provide a tranisient oscillating frequency of 54 Hz, the inductor and capacitor of filter 30*d* may have a series resonant frequency of approximately 57 Hz; and the resistor of filter 30*d* may provide a Q of approximately 1.67 at this frequency.

The components of synchronizing circuit 41*a* may have values identical to those of filter 30*d*. When a synchronizing error exists and the capacitor of circuit 41*a* is charged through one of the diodes of limiter 45*a*, the decaying transient oscillation of circuit 41*a* will be identical to that of circuit 30c, except for the initial 0.1 volt difference to forwardly bias such diode. In FIG. 5, circuit 41 provides only an approximation to the general S-shape of the decaying transient associated with the sharp lower cutoff frequency of the pass band. When capacitor 40 is charged through one of the diodes of limiter 45*a* the transient oscillation from amplifier 28*a* will have a frequency of 1,200 Hz, while circuit 41 (which is tuned to approximately 500 Hz with a damping factor of 0.6) will provide a transient oscillation having a frequency of approximately 400 Hz.

In FIG. 1, the transmission bandwidth is 3,000 −200 = 2,800 Hz; and the band of suppressed signal components is 200/2,800 =7.1 percent of transmission bandwidth. Where the band of suppressed signal components is, for example, less than 1 percent of transmission bandwidth then compensating circuit 30 of FIG. 1 may be omitted; and only the rudimentary low-pass filter comprising resistor 42 and capacitor 40 is necessary to supply the very small band of suppressed signal components, including the carrier or direct-current component, in response to converter 50.

It will be seen that I have accomplished the objects of my invention. I have provided a digital transmission system having an increased speed of information for a given bandwidth. In my digital transmission system, low-frequency signal components including the carrier are suppressed; and only high-frequency signal components are transmitted. There is provided a compensating circuit which responds to the transmitted high-frequency signal components and generates the suppressed low-frequency signal components are supplied either in two stages, as in FIGS. 1 and 7, or in a single stage as in FIG. 5. In all embodiments, the output of converter 50 provides at least the very lowest frequency signal components including the carrier or direct-current signal component.

It will be understood that certain features and subcombinations are of utility and may be employed without reference to other features and subcombinations. This is contemplated by and is within the scope of my claims. It will be further obvious that various changes may be made in details within the scope of my claims without departing from the spirit of my invention. It is, therefore, to be understood that my invention is not to be limited to the specific details shown and described.

Having thus described my invention, what I claim is:

1. A digital transmission system including in combination encoding means providing a multiple-level analog signal, a band-pass filter having an input and providing an output, means coupling the signal to the filter input, said filter having a lower cutoff frequency greater than zero whereby a band of low-frequency components of the analog signal is suppressed and only high-frequency components of the analog signal are provided at the filter output, first analog-to-digital conversion means having an input, second digital-to-analog conversion means, first means coupling the filter output to the input of the first conversion means, means coupling the first conversion means to the second conversion means, means responsive to the second conversion means for providing a compensating signal closely approximating at least a low-frequency portion of the band of suppressed frequency components of the analog signal, and second means for coupling the compensating signal means to the input of the first conversion means.

2. A system as in claim 1 wherein the compensating signal means filter comprising a resistor and a capacitor, wherein the first coupling means includes said capacitor, and wherein the second coupling means includes said resistor.

3. A system as in claim 1 wherein the first coupling means includes a summing device and means coupling the filter output to the device and means coupling the device to the input of first conversion means, and wherein the second coupling means comprises means for coupling the compensating signal means to the summing device.

4. A system as in claim 1 wherein the first coupling means includes a summing device and means coupling the filter output to the device and means coupling the device to the input of the first conversion means, the system further including a compensating circuit, means coupling the filter output to the compensating circuit, and means coupling the compensating circuit to the summing device.

5. A system as in claim 1 wherein the first coupling means comprises a low pass filter serially connected to an integrator.

6. A system as in claim 1 wherein the first coupling means comprises an operational amplifier connected as an integrator and provided with direct-current feedback through a low-pass filter.

7. A system as in claim 1 wherein the first coupling means comprises a phase lag circuit connected in series with a low-pass filter.

8. A system as in claim 1 wherein the compensating signal means includes a low-pass filter comprising one and one-half constant-*k* sections.

9. A system as in claim 1 wherein the compensating signal means includes a low-pass filter comprising a constant-*k* midsection with *m*-derived half sections at each end.

10. A system as in claim 1 wherein the compensating signal means includes a filter comprising a constant-*k* midsection with *m*-derived half sections at each end, where *m* has less than a 0.6 value.

11. A system as in claim 1 wherein the compensating signal means includes a low-pass filter comprising an underdamped series L-C-R circuit providing an output across its capacitor.

12. A system as in claim 1 which further includes a digital input source, means coupling the source to the encoding means, a digital output device, and means coupling the first conversion means to the output device, wherein the input source includes a scrambler and the output device includes an unscrambler.

13. A system as in claim 1 wherein the encoding means provides at least four analog levels representing at least two digits in a unit distance code.

14. A system as in claim 1 wherein the encoding means provides a plurality of consecutive analog levels representing digital information and an additional analog level adjacent one extreme of said information levels.

15. A system as in claim 1 wherein the encoding means provides a plurality of consecutive analog levels representing digital information and an additional analog level adjacent one extreme of said information levels, the system further including means for periodically providing a reference signal comprising two successive pulses, the first pulse consisting of said additional analog level and the second pulse consisting of the other extreme of said information levels.

16. A system as in claim 1 wherein the encoding means provides a plurality of analog levels representing digital information and a first additional analog level which exceeds any of said information levels and a second additional analog level which is less than any of said information levels.

17. A system as in claim 1 wherein the encoding means provides a plurality of analog levels representing digital information and at least one additional analog level, the system further including means responsive to the encoding means for periodically providing said additional analog level.

18. A system in claim 1 wherein the encoding means provides a plurality of analog levels representing digital information and a first and a second additional analog level, the system further including means responsive to the encoding means for periodically providing the first and second additional analog levels alternately.

19. A system as in claim 1 wherein the encoding means provides a plurality of analog levels representing digital information and at least one additional analog level, the system further including means responsive to the encoding means for providing said additional analog level with a periodicity which is less than one cycle at the lower cutoff frequency of the band-pass filter.

20. A system as in claim 1 wherein the encoding means provides a plurality of analog levels representing digital information and a first and a second additional analog level, the system further including means responsive to the encoding means for periodically providing the first additional analog level, and means responsive to the encoding means for periodically providing the second additional analog level.

21. A system as in claim 1 further including means responsive to the encoding means for determining the ratio of signals in two distinct frequency bands.

22. A system as in claim 1 including means responsive to the encoding means for detecting signals in a predetermined frequency band.

23. A system as in claim 1 further including means responsive to the encoding means for detecting signals in a frequency band which substantially includes the suppressed low frequency signal components.

24. A system as in claim 1 further including means responsive to the encoding means for detecting signals in a frequency band which includes the high frequency signal components.

25. A system as in claim 1 further including means responsive to the encoding means for detecting signals in a frequency band which substantially includes both the low-frequency and the high-frequency signal components.

26. A system as in claim 1 further including means responsive to the encoding means and comprising a squaring circuit for detecting the energy content of signals in a predetermined frequency band.

27. A system as in caim 1 further including means responsive to the encoding means and comprising a full-wave rectifier for detecting the amplitude content of signals in a predetermined frequency band.

28. A system as in claim 1 further including detecting means responsive to the encoding means, and a low-pass filter responsive to the detecting means and having a cutoff frequency not less than approximately one-twelfth the lower cutoff frequency of the band-pass filter.

29. A system as in claim 1 further including detecting means responsive to the encoding means, and a low-pass filter responsive to the detecting means and comprising one and one-half constant-*k* sections.

30. A system as in claim 1 further including detecting means responsive to the encoding means, and a low-pass filter responsive to the detecting means and comprising a constant-*k* midsection with *m*-derived half sections at each end.

31. A system as in claim 1 further including detecting means responsive to the encoding means, and an active low-pass R-C filter responsive to the detecting means.

32. A system as in claim 1 further including detecting means responsive to the encoding means, first low-pass filtering means responsive to the detecting means and having a cutoff frequency not less than approximately one-twelfth lower cutoff frequency of the band-pass filter, and second low-pass filtering means responsive to the detecting means and having a cutoff frequency appreciably greater than that of the first filtering means.

33. A system as in claim 1 further including means for limiting the voltage excursion at the input of the first conversion means.

34. A system as in claim 1 wherein the first coupling means includes a capacitor shunted by a series circuit comprising an inductor and a resistor.

35. A system as in claim 1 wherein the first coupling means comprises an underdamped L-C-R circuit.

36. A system as in claim 1 wherein the first coupling means comprises a variable gain amplifier, the system further including means responsive to the voltage excursion at the input of the first conversion means for controlling the gain of the amplifier.

37. A system as in claim 1 wherein the construction of the band-pass filter is such as to provide a sharp lower cutoff and a gradual upper cutoff.

38. A system as in claim 1 wherein the band-pass filter comprises band-pass filtering means having sharp upper and lower cutoff characteristics connected in series with a band edge rejection filter providing maximum attenuation at the upper cutoff frequency of the band-pass filtering means.

39. A system as in claim 1 wherein the first coupling means includes equalizing means.

40. A system as in claim 1 wherein the first coupling means includes automatically self-adjusting equalizing means.

41. A system as in claim 1 wherein the first coupling means comprises a modulator excited by an oscillator.

42. A system as in claim 1 wherein the first coupling means comprises two modulators and two further band-pass filters.

43. A system as in claim 1 wherein the first coupling means comprises four modulators and four further band-pass filters.

44. A system as in claim 1 wherein the first coupling means includes a modulator comprising a four-quadrant multiplying device.

45. A system as in claim 1 wherein the second coupling means includes a phase-shifting circuit.

46. A system as in claim 1 wherein the second coupling means includes a phase lag circuit.

47. A system as in claim 1 wherein the second coupling means includes a phase lead circuit.

48. A system as in claim 1 wherein the second coupling means includes two phase lead circuits.

49. A system as in claim 1 wherein the encoding means provides analog signal pulses with a certain repetition frequency F such that the frequency F/N is slightly greater than the lower cutoff frequency, where N is an integer not less than two.

50. A system as in claim 1 wherein the first coupling means comprises two serially connected low-pass filters having appreciably different cutoff frequencies.

51. A system as in claim 1 wherein the first coupling means comprises an L-C-R circuit having a series-resonant damping factor of 0.6, approximately.

52. A system as in claim 1 further including means comprising a germanium diode for limiting the voltage excursion at the input of the first conversion means.

53. A system as in claim 1 wherein the construction of the band-pass filter is such as to provide a gradual upper cutoff characteristic, the band-pass filter having a nominal upper cutoff at that frequency where the amplitude response is approximately 50 percent, wherein the encoding means provides analog signal pulses with a repetition frequency F such that the frequency F/N is slightly greater than the lower cutoff frequency, where N is an integer not less than two, and wherein the first coupling means includes equalizing means operative over at least the band from F/N to the nominal upper cutoff frequency.

54. A system as in claim 1 wherein the first coupling means comprises a modulator excited by an oscillator providing a frequency greater than half the bandwidth of the band-pass filter.

55. A system as in claim 1 wherein the first coupling means comprises a modulator exicted by an oscillator providing a frequency greater than the upper cutoff frequency of the band-pass filter.

56. A system as in claim 1 wherein the first coupling means comprises a modulator exicted by an oscillator providing a frequency greater than twice the upper cutoff frequency of the band-pass filter.

57. A system as in claim 1 wherein the first coupling means comprises a balanced modulator.

58. A system as in claim 1 wherein the encoding means provides a plurality of analog levels representing digital information and a first additional analog level which exceeds any of said information levels and a second additional analog level which is less than any of said information levels, the system further including means for periodically providing a reference signal comprising two successive pulses, the first pulse consisting of one of said additional levels and the second pulse consisting of the other of said additional levels.

59. A digital transmission system including in combination encoding means providing a multiple-level analog signal, a band-pass filter having an input and providing an output, means coupling the signal to the filter input, said filter having a lower cutoff frequency greater than zero thereby a band of low-frequency components of the analog signal is suppressed and only high-frequency components of the analog signal are provided at the filter output, means responsive to the filter output for providing a compensating signal closely approximating the suppressed low frequency components of the analog signal, and means for combining the high-frequency signal components and the compensating signal.

60. A system as in claim 59 wherein the combining means comprises a capacitor connected to a resistor, means coupling the high-frequency signal components to the capacitor, and means coupling the compensating signal to the resistor.

61. A system as in claim 59 wherein the combining means comprises a summing device.

62. A system as in claim 59 wherein the compensating signal means includeds analog-to-digital conversion means responsive to the combining means and a digital-to-analog converter responsive to the conversion means.

63. A system as in claim 59 wherein the compensating signal means includes means providing a first signal closely approximating a major and high-frequency portion of the suppressed low-frequency signal components, means providing a second signal closely approximating the residual low-frequency portion of the suppressed low-frequency signal components, and means combining the first and second signals.

64. A system as in claim 59 wherein the compensating signal means includes a low-pass filter.

65. A system as in claim 59 wherein the compensating signal means includes an R-C low-pass filter.

66. A system as in claim 59 wherein the compensating signal means includes an L-C low-pass filter.

67. A system as in claim 59 wherein the compensating signal means includes a low-pass filter comprising one full constant-*k* section.

68. A system as in claim 59 wherein the compensating signal means includes a low-pass filter comprising an underdamped series L-C-R circuit providing an output across its capacitor.

69. A system as in claim 59 wherein the compensating signal means includes a phase-shifting circuit.

70. A system as in claim 59 wherein the compensating signal means includes an integrator.

71. A system as in claim 59 wherein the compensating signal means includes an operational amplifier connected as an integrator and provided with direct-current feedback through a low-pass filter.

72. A system as in claim 59 wherein the construction of the band-pass filter is such as to provide a sharp lower cutoff and a gradual upper cutoff.

73. A system as in claim 59 further including a limiter responsive to the combining means.

74. A system as in claim 59 wherein the compensating signal means includes an equalizing device.

75. A system as in claim 59 wherein the compensating signal means includes a variable gain amplifier.

76. A system as in claim 59 wherein the compensating signal means includes a modulator excited by an oscillator.

77. A system as in claim 59 further including an underdamped network responsive to the combining means and comprising a capacitor shunted by a series circuit including an inductor and a resistor.

78. A system as in claim 59 further including means responsive to the encoding means for so controlling the analog signal as to prevent the occurrence of more than a few cycles of a periodic signal having a fundamental frequency less than the lower cutoff frequency of the band-pass filter.

79. A system as in claim 59 further including means responsive to the encoding means for so controlling the analog signal as to prevent the occurrence of more than approximately six cycles of a periodic signal having a fundamental frequency less than the lower cutoff frequency of the band-pass filter.

80. A system as in claim 59 wherein the compensating signal means includes analog-to-digital conversion means responsive to the combining means, the system further including a digital input source, means coupling the source to the encoding means, a digital output device, and means coupling the conversion means to the output device, wherein the input source includes a scrambler and the output device includes an unscrambler.

* * * * *

UNITED STATES PATENT OFFICE
CERTIFICATE OF CORRECTION

Patent No. 3,760,276 Dated September 18, 1973

Inventor(s) Richard S. Shenier

It is certified that error appears in the above-identified patent and that said Letters Patent are hereby corrected as shown below:

Column 7, line 59, "30" should read -- + --; line 67, "C" (second occurrence) should read -- I --. Column 15, line 64, "with" should read -- the --. Column 28, line 28, "allowing" should read -- following --. Column 30, line 52, after "components" insert -- including the carrier. The low-frequency signal components --. Column 31, line 22, after "means" insert -- includes a low-pass --; line 59, before "filter" insert -- low-pass --. Column 32, line 58, before "including" insert -- further --. Column 33, line 38, after "one-twelfth" insert -- the --. Column 34, line 58, "exicted" should read -- excited --. Column 35, line 11, "thereby" should read -- whereby --; line 28, "includeds" should read -- includes --.

Signed and sealed this 25th day of December 1973.

(SEAL)
Attest:

EDWARD M.FLETCHER,JR.
Attesting Officer

RENE D. TEGTMEYER
Acting Commissioner of Patents